US012194754B2

(12) United States Patent
Haga et al.

(10) Patent No.: US 12,194,754 B2
(45) Date of Patent: Jan. 14, 2025

(54) LIQUID DISCHARGE APPARATUS AND CONTROL METHOD OF LIQUID DISCHARGE APPARATUS

(71) Applicant: SEIKO EPSON CORPORATION, Tokyo (JP)

(72) Inventors: Nanami Haga, Shiojiri (JP); Hiromichi Takanashi, Shiojiri (JP); Tomohiro Kawasaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 196 days.

(21) Appl. No.: 18/145,546

(22) Filed: Dec. 22, 2022

(65) Prior Publication Data

US 2023/0202190 A1 Jun. 29, 2023

(30) Foreign Application Priority Data

Dec. 27, 2021 (JP) ................................ 2021-212432

(51) Int. Cl.

| | |
|---|---|
| ***B41J 2/175*** | (2006.01) |
| ***B41J 2/18*** | (2006.01) |
| ***B41J 2/185*** | (2006.01) |

(52) U.S. Cl.

CPC ........... *B41J 2/17596* (2013.01); *B41J 2/185* (2013.01)

(58) Field of Classification Search

CPC . B41J 2/17596; B41J 2/185; B41J 2/18; B41J 2/175

See application file for complete search history.

(56) References Cited

U.S. PATENT DOCUMENTS

| | | | | |
|---|---|---|---|---|
| 9,242,475 | B2 * | 1/2016 | Otsuka | B41J 2/19 |
| 2012/0162331 | A1 * | 6/2012 | Kataoka | B41J 2/175 347/89 |
| 2020/0262205 | A1 * | 8/2020 | Komatsu | B41J 2/17563 |
| 2022/0016898 | A1 | 1/2022 | Sakai et al. | |
| 2022/0194090 | A1 * | 6/2022 | Toya | B41J 2/19 |

FOREIGN PATENT DOCUMENTS

| | | |
|---|---|---|
| JP | 2005-349843 A | 12/2005 |
| JP | 2022-018222 A | 1/2022 |

* cited by examiner

*Primary Examiner* — Jason S Uhlenhake
(74) *Attorney, Agent, or Firm* — WORKMAN NYDEGGER

(57) ABSTRACT

A liquid discharge apparatus including: a first storage section that stores a liquid; a second storage section that communicates with the first storage section; a supply channel that supplies the liquid from the second storage section to a liquid ejecting head; a collection channel that collects the liquid from the liquid ejecting head to the first storage section; the pressurization section that pressurizes the inside of the second storage section; and a control section, in which the first storage section, the supply channel, the liquid ejecting head, the collection channel, the second storage section, and the communication path form a circulation route, and the control section is configured to execute discharge circulation in which circulation of the liquid is performed while discharging the liquid from the nozzle, and non-discharge circulation in which circulation of the liquid is performed without discharging the liquid from the nozzle.

9 Claims, 10 Drawing Sheets

LIQUID DISCHARGE APPARATUS AND CONTROL METHOD OF LIQUID DISCHARGE APPARATUS

The present application is based on, and claims priority from JP Application Serial Number 2021-212432, filed Dec. 27, 2021, the disclosure of which is hereby incorporated by reference herein in its entirety.

BACKGROUND

1. Technical Field

The present disclosure relates to a liquid discharge apparatus such as a printer and a control method of the liquid discharge apparatus.

2. Related Art

For example, JP-A-2005-349843 discloses a recording apparatus, which is an example of a liquid discharge apparatus that discharges ink, which is an example of a liquid, from nozzles formed in a recording head, which is an example of a liquid ejecting head, to perform printing. The recording apparatus described in JP-A-2005-349843 includes a forward circulation path that supplies ink from an ink tank, which is an example of a second storage section, to a nozzle, and a return circulation path that collects ink from the nozzle to a sub tank, which is an example of a first storage section. The recording apparatus described in JP-A-2005-349843 includes a valve capable of opening and closing a return circulation path, and an air pump, which is an example of a pressurization section. By pressurizing the inside of the ink tank with the air pump in a state where the valve is open, the ink is sent to the forward circulation path. A part of the ink sent to the forward circulation path is ejected from the nozzles. The remaining ink is collected in the sub tank through the return circulation path. In this manner, ink is circulated from the ink tank to the sub tank.

It is conceivable to perform a plurality of types of processing for circulating the liquid between the first storage section, the liquid ejecting head, and the second storage section. In this case, when the inside of the second storage section is pressurized by the pressurization section in a state where the valve is open, there is a concern that it takes a longer time required for the pressure in the second storage section to rise to the pressure required to make the liquid flow from the second storage section to the liquid ejecting head.

SUMMARY

According to an aspect of the present disclosure, there is provided a liquid discharge apparatus including: a liquid ejecting head configured to eject a liquid from a nozzle; a first storage section that stores the liquid; a second storage section that communicates with the first storage section via a communication path and is supplied with the liquid from the first storage section; a supply channel that supplies the liquid from the second storage section to the liquid ejecting head; a collection channel that collects the liquid from the liquid ejecting head to the first storage section; a first valve provided in the communication path and configured to open and close the communication path; a second valve provided in the supply channel and configured to open and close the supply channel; a pressurization section that pressurizes the inside of the second storage section; and a control section, in which the first storage section, the supply channel, the liquid ejecting head, the collection channel, the second storage section, and the communication path form a circulation route through which the liquid circulates, and the control section is configured to execute discharge circulation in which the communication path is closed by the first valve and the supply channel is closed by the second valve, the inside of the second storage section is pressurized to a first pressure by the pressurization section, and then the supply channel is opened by the second valve to perform circulation of the liquid in the circulation route while discharging the liquid from the nozzle, and non-discharge circulation in which the communication path is closed by the first valve and the supply channel is closed by the second valve, the inside of the second storage section is pressurized to a second pressure lower than the first pressure by the pressurization section, and then the supply channel is opened by the second valve to perform circulation of the liquid in the circulation route without discharging the liquid from the nozzle.

According to another aspect of the present disclosure, there is provided a control method of a liquid discharge apparatus including a liquid ejecting head configured to eject a liquid from a nozzle, a first storage section that stores the liquid, a second storage section that communicates with the first storage section via a communication path and is supplied with the liquid from the first storage section, a supply channel that supplies the liquid from the second storage section to the liquid ejecting head, a collection channel that collects the liquid from the liquid ejecting head to the first storage section, a first valve provided in the communication path and configured to open and close the communication path, a second valve provided in the supply channel and configured to open and close the supply channel, and a pressurization section that pressurizes the inside of the second storage section, in which the first storage section, the supply channel, the liquid ejecting head, the collection channel, the second storage section, and the communication path form a circulation route through which the liquid circulates, the method including, when performing discharge circulation in which circulation of the liquid is performed in the circulation route while discharging the liquid from the nozzle, closing the communication path by the first valve and closing the supply channel by the second valve, pressurizing the inside of the second storage section to a first pressure higher than a Meniscus breaking pressure of the nozzle by the pressurization section, and then opening the supply channel by the second valve, and when performing non-discharge circulation in which circulation of the liquid is performed in the circulation route without discharging the liquid from the nozzle, closing the communication path by the first valve and closing the supply channel by the second valve, pressurizing the inside of the second storage section to a second pressure lower than the Meniscus breaking pressure by the pressurization section, and then opening the supply channel by the second valve.

DESCRIPTION OF EXEMPLARY EMBODIMENTS

Figure 1:
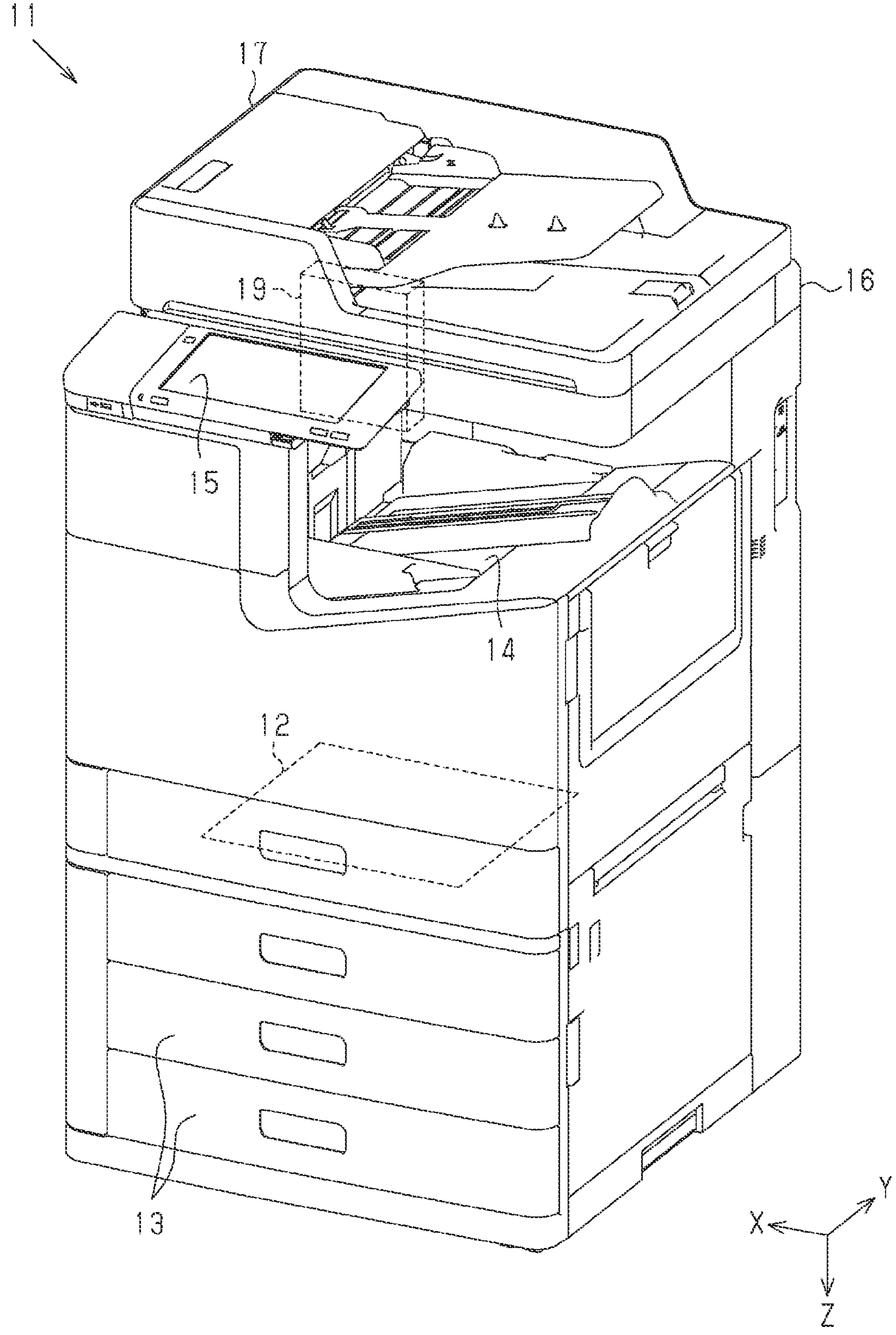
FIG. 1 is a perspective view of an embodiment of a liquid discharge apparatus.

An embodiment of a liquid discharge apparatus and a control method of the liquid discharge apparatus will be described below with reference to the drawings. The liquid discharge apparatus is an ink jet type printer that discharges ink, which is an example of a liquid, onto media such as paper, fabric, vinyl, plastic parts, and metal parts, to perform printing.

In the drawings, a direction of gravity is indicated by a Z axis, and a direction along a horizontal plane is indicated by an X axis and a Y axis, assuming that the liquid discharge apparatus is placed on the horizontal plane. The X axis, the Y axis, and the Z axis are orthogonal to each other.

Liquid Discharge Apparatus

As illustrated in FIG. 1, a liquid discharge apparatus 11 may include a medium accommodation section 13 capable of accommodating a medium 12, a stacker 14 that receives the medium 12 on which printing was performed, and an operation section 15 such as a touch panel for operating the liquid discharge apparatus 11. The liquid discharge apparatus 11 may include an image reading section 16 that reads an image of a document, and an automatic feeding section 17 that sends the document to the image reading section 16.

Figure 2:
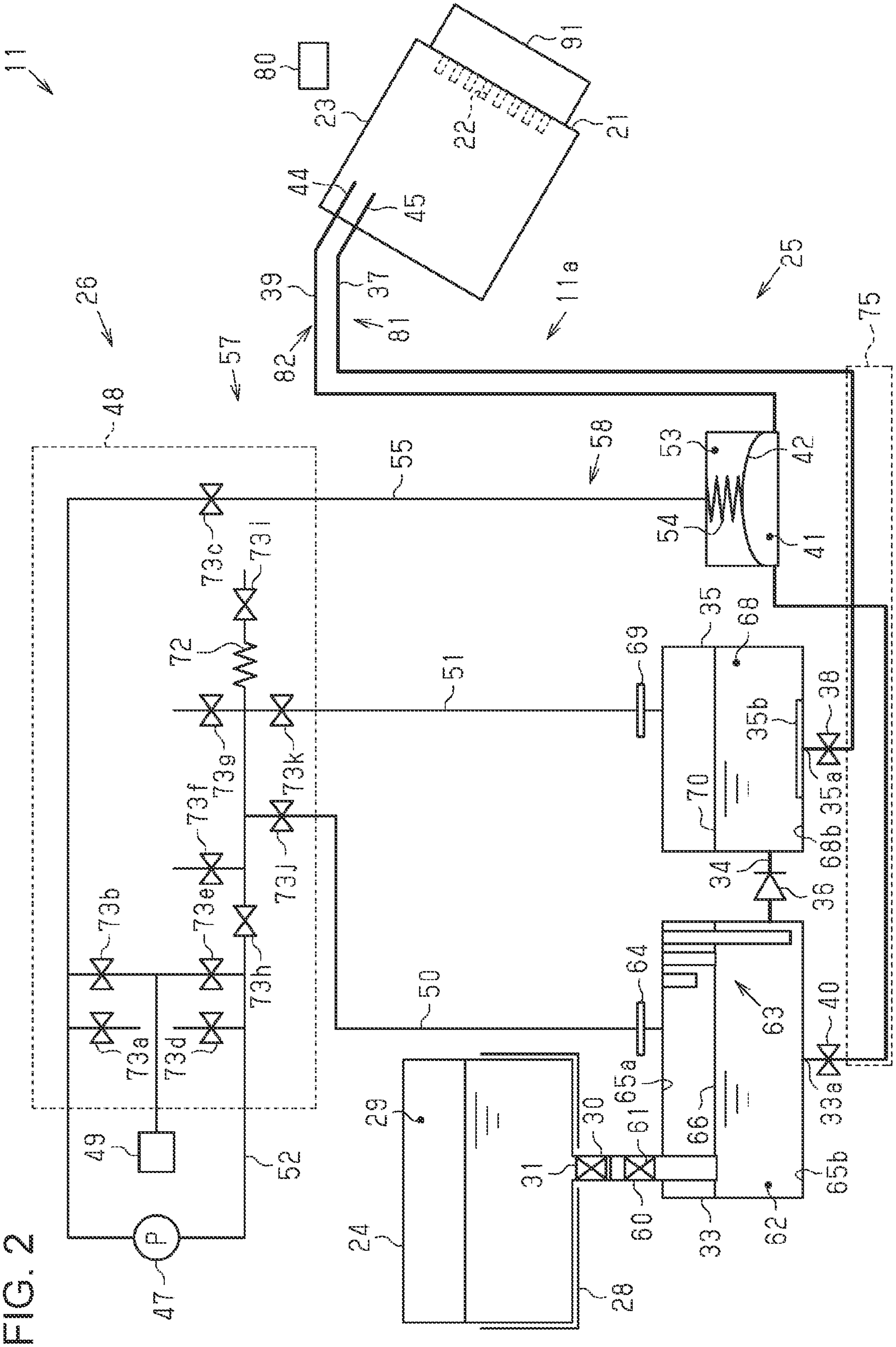
FIG. 2 is a schematic view of the liquid discharge apparatus.

As illustrated in FIGS. 1 and 2, the liquid discharge apparatus 11 includes a liquid ejecting head 23, a first storage section 33, a communication path 34, a second storage section 35, a supply channel 37, a collection channel 39, a first valve 36, a second valve 38, a pressurization section 47, and a control section 19. The first storage section 33, the supply channel 37, the liquid ejecting head 23, the collection channel 39, the second storage section 35, and the communication path 34 form a circulation route 11*a* through which the liquid can be circulated. The liquid discharge apparatus 11 may include a temperature detection section 80. The liquid discharge apparatus 11 may include a third valve 40. The liquid discharge apparatus 11 may include a flat channel 75. The liquid discharge apparatus 11 may include a supply section 81 and a collection section 82. The liquid discharge apparatus 11 may include a maintenance member 91.

As illustrated in FIG. 2, the liquid discharge apparatus 11 may include a supply mechanism 25, a drive mechanism 26, and a switching mechanism 48. The supply mechanism 25 supplies the liquid accommodated in a liquid accommodation section 24 to the liquid ejecting head 23. The supply mechanism 25 includes the first storage section 33, the communication path 34, the second storage section 35, the supply channel 37, the collection channel 39, the first valve 36, the second valve 38, and the pressurization section 47. The drive mechanism 26 drives the supply mechanism 25.

The liquid discharge apparatus 11 may include a plurality of supply mechanisms 25. The plurality of supply mechanisms 25 may supply different types of liquid to the liquid ejecting head 23. For example, the liquid discharge apparatus 11 may perform color printing by discharging a plurality of colors of ink supplied by the plurality of supply mechanisms 25. One drive mechanism 26 may collectively drive the plurality of supply mechanisms 25. The liquid discharge apparatus 11 may include a plurality of drive mechanisms 26 that individually drive the plurality of supply mechanisms 25.

The supply mechanism 25 may include a mounting section 28 on which the liquid accommodation section 24 is attachably and detachably mounted. The liquid accommodation section 24 may include an accommodation chamber 29 for accommodating the liquid, a flow-out section 30 for making the liquid accommodated in the accommodation chamber 29 flow out, and an accommodation section side valve 31 provided in the flow-out section 30. The accommodation chamber 29 of the present embodiment is a closed space that is not in communication with the atmosphere. The liquid accommodation section 24 before being mounted on the mounting section 28 may accommodate a larger amount of liquid than the amount of liquid that the supply mechanism 25 can hold.

The drive mechanism 26 may include the switching mechanism 48 coupled to the pressurization section 47 and a pressure sensor 49 that detects the pressure. The drive mechanism 26 may include an atmosphere open path 50 coupled to the first storage section 33, a pressurization channel 51 coupled to the second storage section 35, and a coupling channel 52 that couples the atmosphere open path 50 and the pressurization channel 51 to the pressurization section 47.

The drive mechanism 26 may have a first supply film 64. The first supply film 64 is a film through which gas easily passes but a liquid does not easily pass. The first supply film 64 is positioned in the atmosphere open path 50. The first supply film 64 reduces the concern that the liquid flows through the atmosphere open path 50. The first supply film 64 reduces the concern that the liquid flows from the first storage section 33 to the drive mechanism 26.

The drive mechanism 26 may have a second supply film 69. The second supply film 69 is a film through which gas easily passes but a liquid does not easily pass. The second supply film 69 is positioned in the pressurization channel 51. The second supply film 69 reduces the concern that the liquid flows through the pressurization channel 51. The second supply film 69 reduces the concern that the liquid flows from the second storage section 35 to the drive mechanism 26.

The drive mechanism 26 may include an air chamber 53 separated from a liquid chamber 41 by a flexible member 42, a spring 54 provided in the air chamber 53, and an air channel 55 coupled to the air chamber 53. The spring 54 pushes the flexible member 42 to reduce pressure fluctuations of the liquid in the collection channel 39 and the liquid ejecting head 23. A part of the liquid chamber 41 is composed of the flexible member 42, and the volume thereof changes as the flexible member 42 deforms.

The switching mechanism 48 includes a narrow tube section 72 provided in the coupling channel 52, and first to eleventh selection valves 73*a* to 73*k* capable of opening and closing the channel. The narrow tube section 72 is a meandering tube that is narrow to the extent that the flow of liquid is severely restricted with respect to the flow of air.

The first selection valve 73*a* is opened to make the air channel 55 communicate with the atmosphere. The second selection valve 73*b* is opened to make the air channel 55 and the pressure sensor 49 communicate with each other. The third selection valve 73*c* is opened to open the air channel 55 and make the pressurization section 47 and the air chamber 53 communicate with each other.

The fourth selection valve 73*d* is opened to make the coupling channel 52 between the pressurization section 47 and the eighth selection valve 73*h* communicate with the atmosphere. The fifth selection valve 73*e* is opened to make the coupling channel 52 and the pressure sensor 49 communicate with each other. The sixth selection valve 73*f* and the seventh selection valve 73*g* are opened to make the coupling channel 52 communicate with the atmosphere. The eighth selection valve 73*h* is opened to open the coupling channel 52. The ninth selection valve 73*i* is opened to make the narrow tube section 72 communicate with the atmosphere. The tenth selection valve 73*j* is opened to open the atmosphere open path 50, and make the first storage section 33 and the coupling channel 52 communicate with each other. The eleventh selection valve 73*k* is opened to open the pressurization channel 51 and make the second storage section 35 and the coupling channel 52 to communicate with each other.

When changing the pressure in the air chamber 53, the switching mechanism 48 opens the second to fourth selection valves 73*b* to 73*d* and closes the other selection valves. When the pressurization section 47 is driven to rotate forward in this state, the air in the air chamber 53 is ejected via the air channel 55 and the coupling channel 52, and the pressure in the air chamber 53 is lowered. When the pressurization section 47 is reversely driven in this state, air is sent into the air chamber 53 via the coupling channel 52 and the air channel 55, and the pressure in the air chamber 53 rises. At this time, the pressure sensor 49 may detect the pressure inside the air channel 55 and the air chamber 53. The control section 19 may control driving of the pressurization section 47 based on the detection result of the pressure sensor 49.

When opening the first storage section 33 to the atmosphere, the switching mechanism 48 opens the sixth selection valve 73*f* and the tenth selection valve 73*j*. A first storage chamber 62 communicates with the atmosphere via the atmosphere open path 50 and the coupling channel 52.

When opening the second storage section 35 to the atmosphere, the switching mechanism 48 opens the seventh selection valve 73*g* and the eleventh selection valve 73*k*. A second storage chamber 68 communicates with the atmosphere via the pressurization channel 51 and the coupling channel 52.

When pressurizing the inside of the second storage section 35, the switching mechanism 48 opens the first selection valve 73*a*, the fifth selection valve 73*e*, the eighth selection valve 73*h*, and the eleventh selection valve 73*k*, and closes the other selection valves. When the pressurization section 47 is driven to rotate forward in this state, air flows into the second storage chamber 68 via the air channel 55, the coupling channel 52, and the pressurization channel 51, and the pressure in the second storage chamber 68 rises. At this time, the pressure sensor 49 may detect the pressure inside the coupling channel 52, the pressurization channel 51, and the second storage chamber 68. The control section 19 may control driving of the pressurization section 47 based on the detection result of the pressure sensor 49.

In the present embodiment, a pressurization mechanism 57 is configured to include the pressurization section 47, the air chamber 53, and the air channel 55 that makes the pressurization section 47 and the air chamber 53 communicate with each other, and a slight pressurization section 58 is configured by adding the liquid chamber 41 to the pressurization mechanism 57. The slight pressurization section 58 has the liquid chamber 41 and the pressurization mechanism 57 capable of pressurizing the flexible member 42 from the outside of the liquid chamber 41. The slight pressurization section 58 pressurizes the liquid in the collection channel 39.

Liquid Ejecting Head

The liquid ejecting head 23 can eject the liquid from nozzles 22. The nozzles 22 are provided on a nozzle surface 21. The liquid ejecting head 23 may be arranged to have an inclined posture in which the nozzle surface 21 is inclined with respect to the horizontal. The liquid ejecting head 23 may execute printing by ejecting the liquid onto the medium 12 in an inclined posture. The liquid ejecting head 23 of the present embodiment is of a line type provided across the width direction of the medium 12. The liquid ejecting head 23 may be configured as a serial type that performs printing while moving in the width direction of the medium 12.

The liquid ejecting head 23 may have a first coupling section 44 and a second coupling section 45. In the inclined posture, the first coupling section 44 may be arranged at a position higher than the second coupling section 45.

Maintenance Member

The maintenance member 91 performs various types of maintenance on the liquid ejecting head 23. The maintenance member 91 may perform wiping, flushing, and idle suction as maintenance. Wiping may be performed by displacing the maintenance member 91 along the nozzle surface 21. In wiping, the maintenance member 91 wipes off the liquid adhering to the nozzle surface 21. Flushing may be performed by discharging the liquid from the nozzles 22 onto the maintenance member 91 in a state where the nozzle surface 21 is separated from the maintenance member 91. In the idle suction, the liquid accumulated in the maintenance member 91 by flushing may be ejected from the maintenance member 91 to an ejection tank (not illustrated).

Supply Channel and Collection Channel

The supply channel 37 supplies the liquid from the second storage section 35 to the liquid ejecting head 23. The supply channel 37 may be coupled to the second coupling section 45 of the liquid ejecting head 23. The upstream end of the supply channel 37 may be coupled to the second storage section 35 and the downstream end of the supply channel 37 may be coupled to the second coupling section 45.

The collection channel 39 collects the liquid from the liquid ejecting head 23 to the first storage section 33. The collection channel 39 may be coupled to the first coupling section 44 of the liquid ejecting head 23. The upstream end of the collection channel 39 may be coupled to the first coupling section 44 and the downstream end of the collection channel 39 may be coupled to the first storage section 33.

First Storage Section

The first storage section 33 stores the liquid. The upstream end of the communication path 34 may be coupled to the first storage section 33. The liquid is supplied from the liquid accommodation section 24 to the first storage section 33. The first storage section 33 may have a flow-in section 60 into which the liquid accommodated in the liquid accommodation section 24 mounted on the mounting section 28 can flow. The first storage section 33 may have an apparatus side valve 61 provided in the flow-in section 60, a first storage chamber 62 for storing the liquid, and a liquid level sensor 63 for detecting the amount of liquid stored in the first storage chamber 62.

The apparatus side valve 61 opens together with the accommodation section side valve 31 when the liquid accommodation section 24 is mounted on the mounting section 28. While the liquid accommodation section 24 is mounted on the mounting section 28, the open state of the apparatus side valve 61 is maintained together with the accommodation section side valve 31. When the liquid accommodation section 24 is mounted on the mounting section 28, the apparatus side valve 61 opens before the accommodation section side valve 31, thereby reducing the concern that the liquid leaks from the liquid accommodation section 24.

The flow-in section 60 is provided to penetrate a ceiling 65*a* of the first storage chamber 62. The lower end of the flow-in section 60 is positioned inside the first storage chamber 62 and below the ceiling 65*a*. The upper end of the flow-in section 60 is positioned outside the first storage chamber 62 and above the ceiling 65*a*. The flow-in section 60 is coupled to the flow-out section 30 included in the liquid accommodation section 24 by mounting the liquid accommodation section 24 on the mounting section 28.

A lower end of the flow-in section 60 is positioned below the nozzle surface 21. As a result, a first liquid level 66 of the liquid stored in the first storage section 33 fluctuates in a range lower than the nozzle surface 21. Specifically, the liquid in the liquid accommodation section 24 is supplied to the first storage section 33 via the flow-out section 30 and the flow-in section 60 due to the hydraulic head. Air flows from the first storage section 33 into the liquid accommodation section 24 via the flow-in section 60 and the flow-out section 30 by the amount of the liquid supplied to the first storage section 33. The first liquid level 66 rises by the amount of the supplied liquid. When the first liquid level 66 reaches the lower end of the flow-in section 60, the inflow of air from the first storage section 33 to the liquid accommodation section 24 is restricted. Since the accommodation chamber 29 is sealed, when the inflow of air is restricted, the pressure in the accommodation chamber 29 is lowered by the amount of the supplied liquid. When the negative pressure in the accommodation chamber 29 becomes higher than the hydraulic head of the liquid in the accommodation chamber 29, the supply of liquid from the liquid accommodation section 24 to the first storage section 33 is restricted.

The first liquid level 66 is lowered as the liquid is supplied from the first storage section 33 to the second storage section 35. When the first liquid level 66 is lowered and air flows into the accommodation chamber 29 via the flow-in section 60 and the flow-out section 30, the negative pressure in the accommodation chamber 29 decreases. When the negative pressure in the accommodation chamber 29 becomes smaller than the hydraulic head of the liquid in the accommodation chamber 29, the liquid is supplied from the liquid accommodation section 24 to the first storage section 33. Therefore, while the liquid is accommodated in the liquid accommodation section 24, the first liquid level 66 is maintained at the standard position, which is a position in the vicinity of the lower end of the flow-in section 60. When the liquid accommodated in the liquid accommodation section 24 runs out, the first liquid level 66 is positioned below the standard position.

The liquid level sensor 63 may detect that the first liquid level 66 is positioned at the standard position, that the first liquid level 66 is positioned below the standard position, and that the first liquid level 66 is positioned at the full position above the standard position. When the first liquid level 66 is positioned at the full position, the first storage section 33 stores the maximum amount of liquid.

In the first storage section 33, an inlet 33*a* into which the liquid in the collection channel 39 flows is formed. The inlet 33*a* is positioned below the center of the first storage section 33. The inlet 33*a* may be a through-hole penetrating a first bottom 65*b* that is the bottom of the first storage chamber 62. The inlet 33*a* may be positioned at the center of the first bottom 65*b*. The first storage chamber 62 and the collection channel 39 communicate with each other via the inlet 33*a*.

The standard position of the first liquid level 66 is positioned above the position of the inlet 33*a* in the first storage chamber 62. Therefore, when the first liquid level 66 is at the standard position, the liquid in the first storage section 33 can be supplied to the liquid ejecting head 23 via the collection channel 39.

Second Storage Section

The second storage section 35 communicates with the first storage section 33 via the communication path 34. A downstream end of the communication path 34 may be coupled to the second storage section 35. The liquid is supplied from the first storage section 33 to the second storage section 35.

The second storage section 35 may be supplied with the liquid from the first storage section 33 via the communication path 34 due to the difference in hydraulic head. When the pressure inside the first storage chamber 62 and the inside of the second storage chamber 68 is set to atmospheric pressure, a second liquid level 70 of the liquid in the second storage section 35 is the same height as the first liquid level 66. In other words, the second liquid level 70 is maintained at the standard position that is approximately the same height as the lower end of the flow-in section 60 and fluctuates within a range lower than the nozzle surface 21. The liquid in the liquid ejecting head 23 is maintained at a negative pressure due to the hydraulic head difference between the liquid in the first storage section 33 and the second storage section 35. When the liquid is consumed in the liquid ejecting head 23, the liquid stored in the second storage section 35 is supplied to the liquid ejecting head 23.

A supply port 35*a* for supplying the liquid into the supply channel 37 may be formed in the second storage section 35. The supply port 35*a* may be positioned below the center of the second storage section 35. The supply port 35*a* may be a through-hole penetrating a second bottom 68*b*, which is the bottom of the second storage chamber 68. The supply port 35*a* may be positioned at the center of the second bottom 68*b*. The second storage chamber 68 and the supply channel 37 communicate with each other via the supply port 35*a*. The second storage section 35 may be provided with a filter 35*b*. The filter 35*b* is positioned in second storage chamber 68. The filter 35*b* covers the supply port 35*a*.

First Valve

The first valve 36 is provided in the communication path 34. The first valve 36 can open and close the communication path 34. The first valve 36 is a one-way valve. The first valve 36 allows the liquid to flow from the first storage section 33 to the second storage section 35. The first valve 36 restricts the flow of the liquid from the second storage section 35 to the first storage section 33. The first valve 36 closes the communication path 34 when the pressure inside the second storage section 35 is higher than the pressure inside the first storage section 33.

Second Valve and Third Valve

The second valve 38 is provided in the supply channel 37. The second valve 38 can open and close the supply channel 37. The third valve 40 is provided in the collection channel 39. The slight pressurization section 58 is provided in the collection channel 39 between the third valve 40 and the liquid ejecting head 23. The liquid chamber 41 is positioned in the collection channel 39 between the third valve 40 and the liquid ejecting head 23. The third valve 40 can open and close the collection channel 39. The opening and closing of the second valve 38 and the third valve 40 are controlled by the control section 19.

The second valve 38 and the third valve 40 may be closed when the liquid discharge apparatus 11 is powered off. By closing the supply channel 37 and the collection channel 39, it is possible to reduce the concern that the liquid leaks from the liquid ejecting head 23, for example, even when the liquid discharge apparatus 11 is subjected to vibration or impact.

The second valve 38 and the third valve 40 are opened when printing is performed by the liquid discharge apparatus 11. As a result, the liquid is supplied from the second storage section 35 to the supply channel 37 during printing. The liquid is supplied from the first storage section 33 to the collection channel 39. The liquid is supplied to the liquid ejecting head 23 from the supply channel 37 and the collection channel 39.

Flat Channel

The flat channel 75 is positioned below the first storage section 33 and the second storage section 35. The flat channel 75 includes a part of the supply channel 37 and a part of the collection channel 39. Further, the flat channel 75 may include at least one of the air channel 55, the second valve 38, and the third valve 40.

Figure 3:
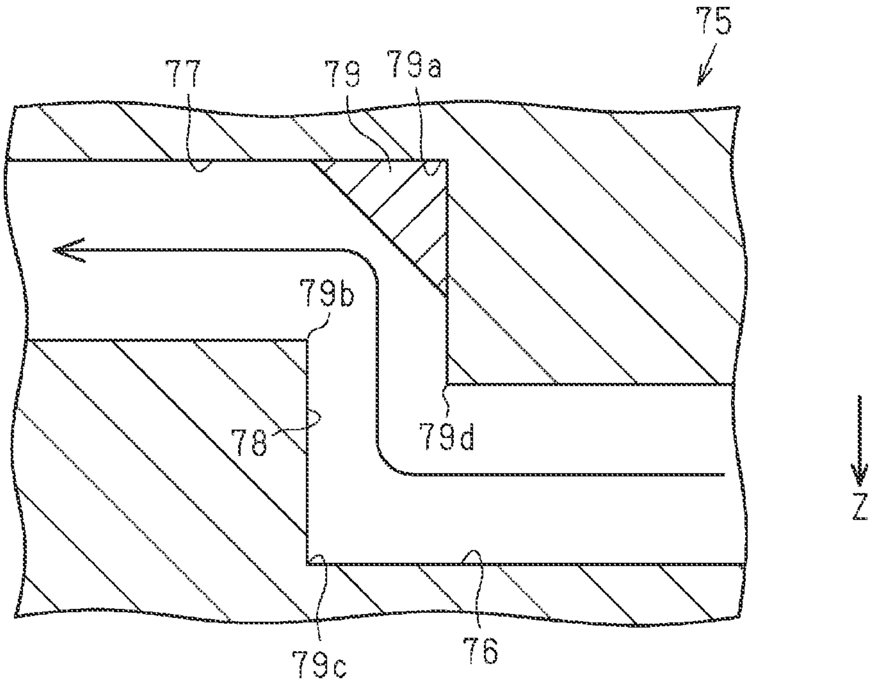
FIG. 3 is a sectional view illustrating a part of a flat channel.

As illustrated in FIG. 3, the flat channel 75 has a first channel 76, a second channel 77 and a third channel 78. Each of the first channel 76 and the second channel 77 extends perpendicular to the third channel 78. The second channel 77 is positioned above the first channel 76. The third channel 78 couples the downstream end of the first channel 76 and the upstream end of the second channel 77. The third channel 78 extends upward from the downstream end of the first channel 76 to the upstream end of the second channel 77.

The flat channel 75 has a blocking section 79. The blocking section 79 blocks a first corner section 79*a* formed by the downstream end of the third channel 78 and the upstream end of the second channel 77. The blocking section 79 may have a triangular sectional shape that blocks the first corner section 79*a*. The blocking section 79 is separate from the member that forms the flat channel 75. The blocking section 79 may be integrally molded with the member that forms the flat channel 75.

The liquid flowing through the flat channel 75 flows from the first channel 76 to the second channel 77 via the third channel 78 as indicated by the arrow in FIG. 3. When the liquid flows from the first channel 76 into the third channel 78, the direction of the liquid flow changes upward. When the liquid flows into the second channel 77 from the third channel 78, the liquid flows along the surface of the blocking section 79. Compared to the case where the first corner section 79*a* is not blocked by the blocking section 79, stagnation of the liquid flow is less likely to occur at the upstream end of the second channel 77. As a result, it is possible to suppress staying of bubbles in the liquid at the upstream end of the second channel 77.

A second corner section 79*b* of the flat channel 75, which faces the first corner section 79*a* where the blocking section 79 is provided, may be chamfered. As a result, the blocking section 79 can be formed at the first corner section 79*a* while suppressing narrowing of the channels of the third channel 78 and the second channel 77. The blocking section 79 may block a third corner section 79*c* formed by the downstream end of the first channel 76 and the upstream end of the third channel 78. A fourth corner section 79*d* of the flat channel 75, which faces the third corner section 79*c* where the blocking section 79 is provided, may be chamfered. As a result, the blocking section 79 can be formed at the third corner section 79*c* while suppressing narrowing of the channels of the first channel 76 and the third channel 78.

Pressurization Section

As illustrated in FIG. 2, the pressurization section 47 pressurizes the inside of the second storage section 35. The first valve 36 closes the communication path 34 as the second storage section 35 is pressurized with the pressurization section 47. The pressurization section 47 is, for example, a tube pump that sends out the air by rotating while crushing a tube with a roller. A tube (not illustrated) of the pressurization section 47 has one end coupled to the air channel 55 and the other end coupled to the coupling channel 52. The pressurization section 47 sends out the air taken in from the air channel 55 to the coupling channel 52 by being driven to rotate forward. The pressurization section 47 sends out the air taken in from the coupling channel 52 to the air channel 55 by being reversely driven.

Temperature Detection Section

The temperature detection section 80 detects the environmental temperature, which is the temperature of the environment in which the liquid discharge apparatus 11 is used. The temperature detection section 80 detects the temperature at the position where the temperature detection section 80 is installed as the environmental temperature. The environmental temperature detected by the temperature detection section 80 may be the Celsius temperature. The control section 19 may perform various controls based on the environmental temperature detected by the temperature detection section 80. The temperature detection section 80 may detect the temperature of the medium 12 on which printing was performed. The temperature detection section 80 may be installed near the liquid ejecting head 23.

Supply Section and Collection Section

Figure 4:
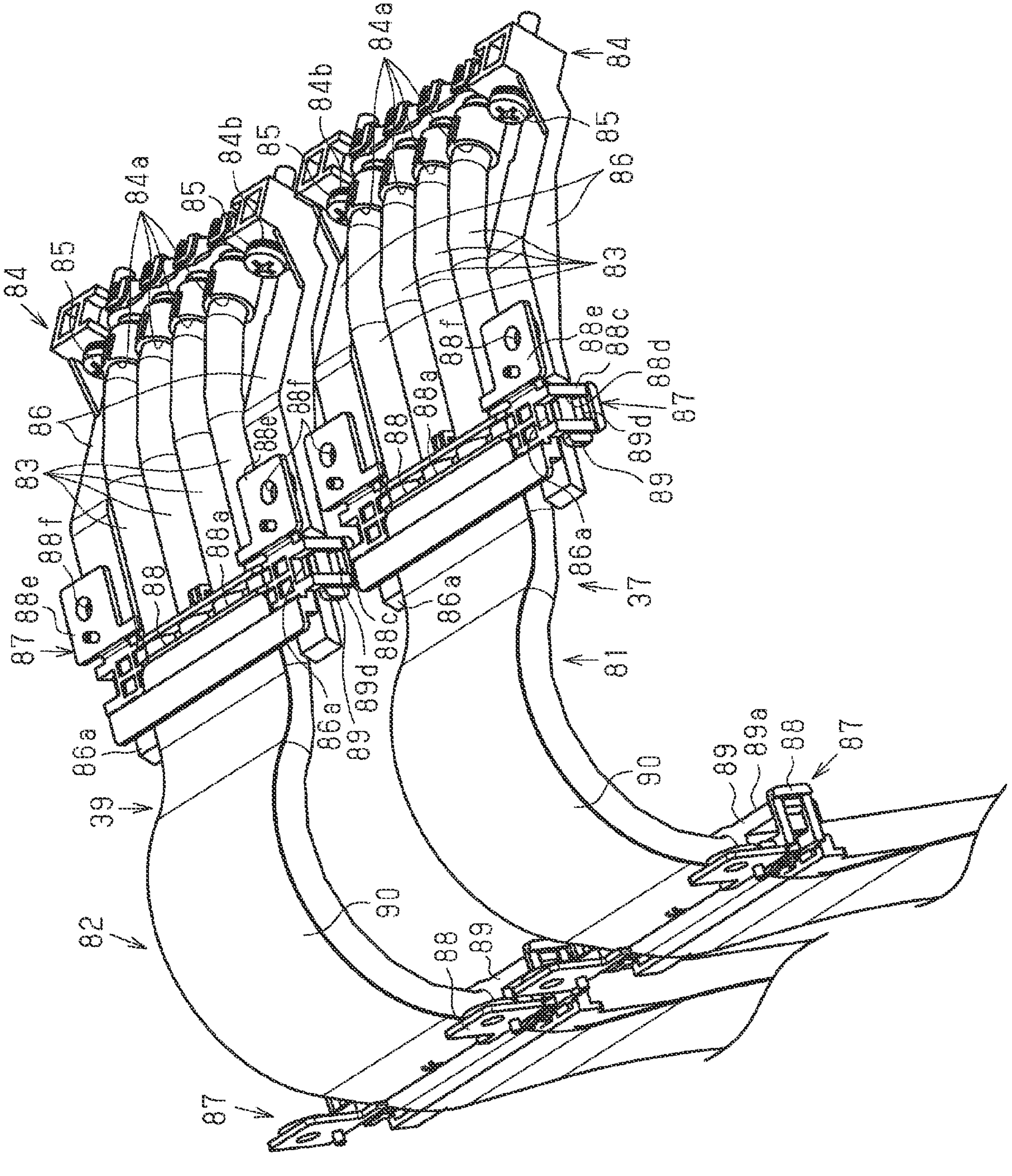
FIG. 4 is a perspective view illustrating a supply section and a collection section.

As illustrated in FIG. 4, the supply section 81 and the collection section 82 may include tubes 83. Each of the supply section 81 and the collection section 82 may include a plurality of tubes 83. Inks of different colors flow through the plurality of tubes 83 in the supply section 81. Inks of different colors flow through the plurality of tubes 83 in the collection section 82. Each of the supply section 81 and the collection section 82 may include four tubes 83.

Each of the plurality of tubes 83 of the supply section 81 forms a part of the supply channels 37 different from each other. The tube 83 of the supply section 81 includes the end portion of the supply channel 37. Each of the plurality of tubes 83 of the collection section 82 forms a part of the collection channels 39 different from each other. The tube 83 of collection section 82 includes the end portion of the collection channel 39. In each of the supply section 81 and the collection section 82, the end portion of the tube 83 is coupled to the liquid ejecting head 23.

Each of the supply section 81 and the collection section 82 may include a joint section 84, an arm section 86 and a clamp section 87. The joint section 84 is attached to the plurality of tubes 83 by outsert molding in each of the supply section 81 and the collection section 82. The joint section 84 is formed with a plurality of tube insertion holes 84*a*. Four tube insertion holes 84*a* are formed in the joint section 84 of the present embodiment. The four tube insertion holes 84*a* are arranged side by side in one direction. In the flow direction of the liquid flowing from the tubes 83 to the liquid ejecting head 23, the downstream ends of the plurality of tubes 83 may be inserted through the tube insertion holes 84*a* different from each other.

Figure 5:
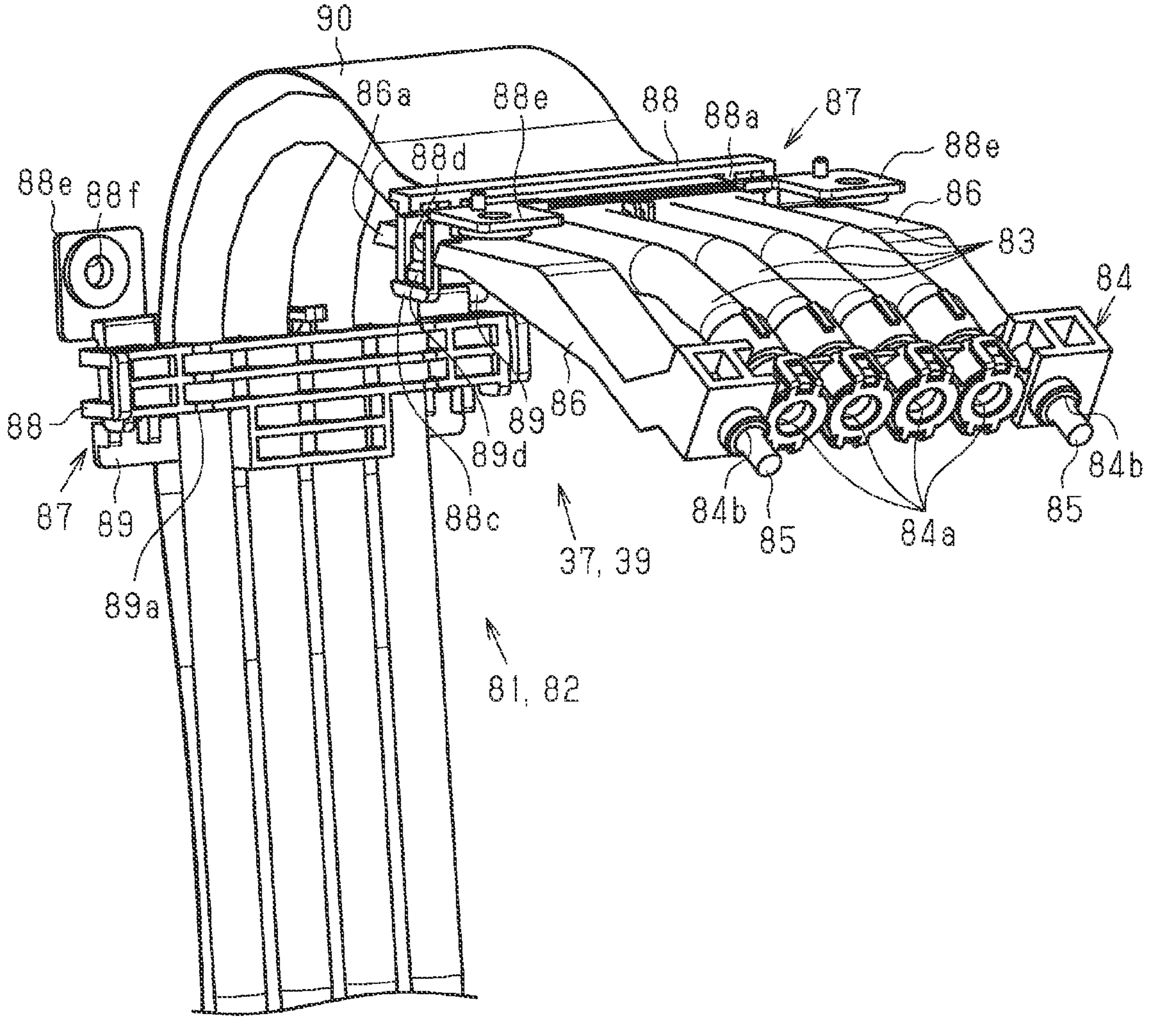
FIG. 5 is a perspective view illustrating the supply section and the collection section.

As illustrated in FIG. 5, a first screw insertion hole 84*b* is formed in the joint section 84. Two first screw insertion holes 84*b* are formed in the joint section 84 of the present embodiment. The two first screw insertion holes 84*b* are positioned in the joint section 84 to sandwich the four tube insertion holes 84*a*. A screw member 85 is inserted through each of the two first screw insertion holes 84*b*. The tube 83 and the joint section 84 are coupled to the liquid ejecting head 23 by fastening the screw member 85 inserted through the first screw insertion hole 84*b* to a screw insertion hole (not illustrated) of the liquid ejecting head 23.

The arm section 86 is integrated with the joint section 84. The arm section 86 extends from each of one end and the other end of the joint section 84. Each of the supply section 81 and the collection section 82 may include a plurality of clamp sections 87. The plurality of clamp sections 87 are attached to locations different from each other in the tube 83. Each of the plurality of clamp sections 87 includes a first clamp section 88 and a second clamp section 89. Each of the plurality of clamp sections 87 sandwiches the plurality of tubes 83 from both sides with the first clamp section 88 and with second clamp section 89.

Figure 6:
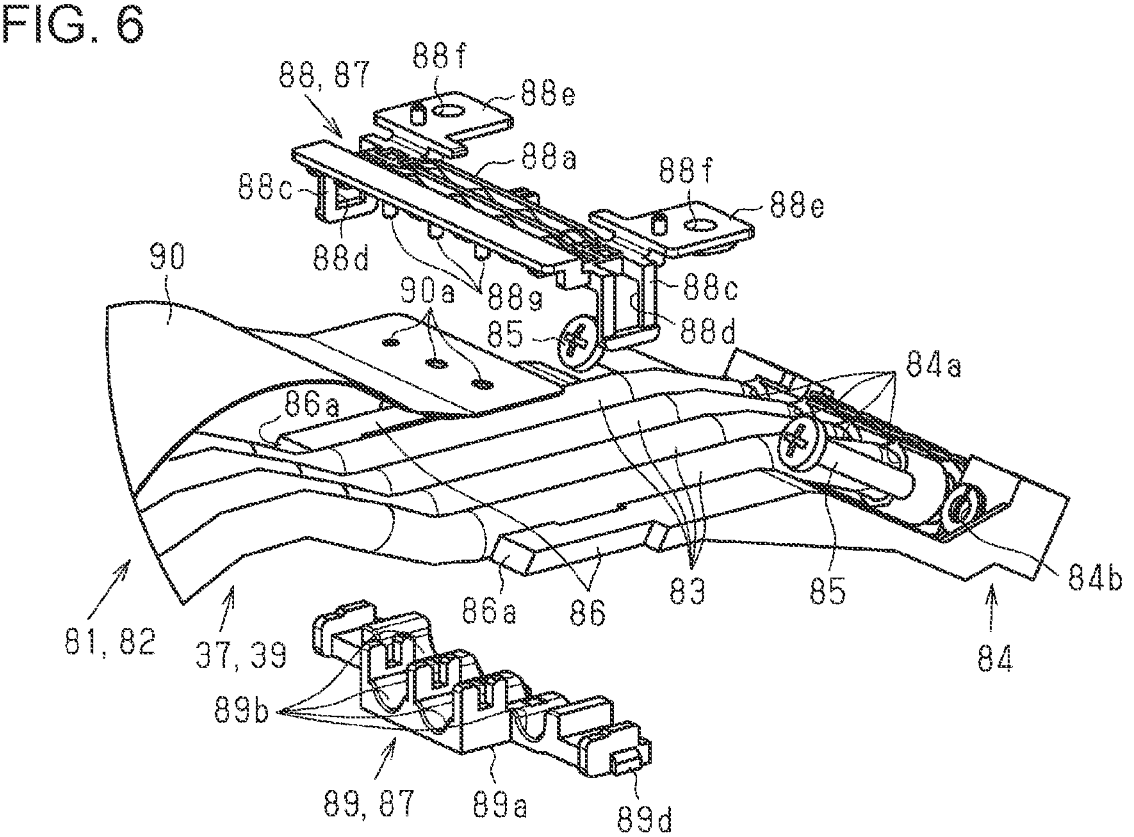
FIG. 6 is an exploded perspective view illustrating the supply section and the collection section.
Figure 7:
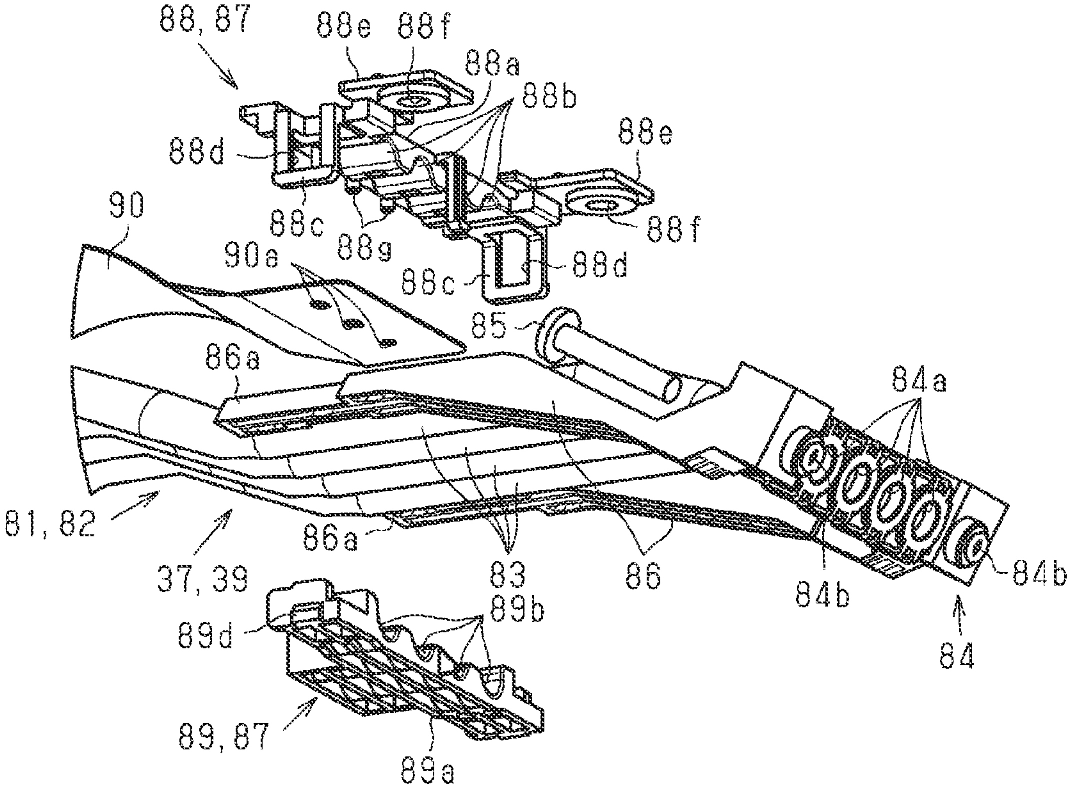
FIG. 7 is an exploded perspective view illustrating the supply section and the collection section.

As illustrated in FIGS. 6 and 7, the supply section 81 and the collection section 82 may include a protection section 90. The protection section 90 may be a long belt-shaped film. The protection section 90 may be a polyester film. The protection section 90 is positioned to cover the plurality of tubes 83 from one side. An insertion hole 90*a* is formed in an end portion of the protection section 90. A plurality of insertion holes 90*a* may be positioned to be equally spaced from each other in the lateral direction of the protection section 90.

The first clamp section 88 includes a first main body 88*a*. A plurality of first recess sections 88*b* are formed on the side surface of the first main body 88*a*. In the first clamp section 88 overlapping the plurality of tubes 83 from above the plurality of tubes 83, the plurality of first recess sections 88*b* are positioned on the lower surface of the first main body 88*a*.

Each of the plurality of first recess sections 88*b* opens toward the second clamp section 89. Four first recess sections 88*b* are formed in the first main body 88*a* in the present embodiment. The four first recess sections 88*b* are adjacent to each other. The tube 83 is fitted in each of the four first recess sections 88*b*. Thereby, the first clamp section 88 partially overlaps each of the plurality of tubes 83.

The first clamp section 88 includes a plurality of protrusion sections 88*g* protruding from the first main body 88*a* toward the second clamp section 89. The protection section 90 is fixed to the first clamp section 88 by inserting each of the plurality of protrusion sections 88*g* into the insertion holes 90*a* of the protection section 90. An end portion of the protection section 90 is interposed between the first clamp section 88 and the plurality of tubes 83.

The first clamp section 88 includes two first protrusion sections 88*c*. The first protrusion sections 88*c* extend from both end portions of the first main body 88*a* toward the second clamp section 89. An engagement hole 88*d* is formed in the first protrusion section 88*c*. The first protrusion sections 88*c* are positioned to sandwich the four tubes 83 from both sides. A tip end portion 86*a* of the arm section 86 may be interposed between the tube 83 and the first protrusion section 88*c*, with the coupling part of the arm section 86 to the joint section 84 as the proximal end.

The first clamp section 88 includes two second protrusion sections 88*e*. The second protrusion sections 88*e* extend from both end portions of the first main body 88*a*. A second screw insertion hole 88*f* is formed in the second protrusion section 88*e*. The screw member 85 can be inserted through the second screw insertion hole 88*f*. When it is necessary to fix the first clamp section 88 to a separate member, the screw member 85 is inserted through the second screw insertion hole 88*f*, and the screw member 85 inserted through the second screw insertion hole 88*f* is fastened to the screw insertion hole (not illustrated) of the separate member.

The second clamp section 89 includes a second main body 89*a*. A plurality of second recess sections 89*b* are formed on the side surface of the second main body 89*a*. In the second clamp section 89 overlapping the plurality of tubes 83 from below the plurality of tubes 83, the plurality of second recess sections 89*b* are positioned on the upper surface of the second main body 89*a*.

Each of the plurality of second recess sections 89*b* opens toward the first clamp section 88. In the present embodiment, four second recess sections 89*b* are formed in the second main body 89*a*. The four second recess sections 89*b* are adjacent to each other. The tube 83 is fitted in each of the four second recess sections 89*b*. Thereby, the second clamp section 89 partially overlaps each of the plurality of tubes 83.

The second clamp section 89 has an engaging end portion 89*d*. The engaging end portions 89*d* are positioned at both end portions of the second main body 89*a*. The second clamp section 89 is positioned between the first protrusion sections 88*c* positioned at both end portions of the first main body 88*a*. The engaging end portion 89*d* is engaged with the first protrusion section 88*c* by inserting the engaging end portion 89*d* into the engagement hole 88*d* positioned in the first protrusion section 88*c*. The first clamp section 88 and the second clamp section 89 are integrated. The four tubes 83 and the tip end portions 86*a* of the arm sections 86 may be sandwiched from both sides by the first clamp section 88 and the second clamp section 89 that are integrated.

Control Section

As illustrated in FIG. 1, the control section 19 controls various operations executed by the liquid discharge apparatus 11. The control section 19 may configure a circuitry including (α) one or more processors that execute various types of processing according to a computer program, (β) one or more dedicated hardware circuits that execute at least a part of various types of processing, or (γ) a combination thereof. The hardware circuit is, for example, an application-specific integrated circuit. The processor includes a CPU and a memory such as a RAM and a ROM, and the memory stores a program code or a command configured to cause the CPU to execute processing. A memory, that is, a computer-readable medium, includes any readable medium accessible by a general purpose or dedicated computer.

When the liquid level sensor 63 detects that the first liquid level 66 is positioned below the standard position, the control section 19 may determine that the liquid accommodation section 24 is empty, and instruct the user to replace the liquid accommodation section 24.

The control section 19 can execute discharge circulation and non-discharge circulation. The control section 19 can execute filling circulation. The control section 19 can execute slight pressurization discharging. The control section 19 can switch between closing and opening of the collection channel 39 by the third valve 40.

Next, a control method of the liquid discharge apparatus 11 will be described with reference to the flow charts illustrated in FIGS. 8 to 11. Here, the order of steps in each control method can be changed in any manner without departing from the purpose of each control method. Discharge circulation The discharge circulation routine will be described with reference to FIG. 8. The discharge circulation may be executed at the timing when the liquid accommodation section 24 is first mounted on the mounting section 28. When the discharge circulation is performed at the timing when the mounting section 28 is first mounted, the discharge circulation may be executed after the filling circulation is performed. The discharge circulation may be executed during standby when printing or the like is not performed. The discharge circulation may be executed periodically. The discharge circulation may be executed with respect to some of the plurality of supply channels 37 and some of the plurality of collection channels 39, and then may be executed with respect to the remaining supply channels 37 and collection channels 39.

Figure 8:
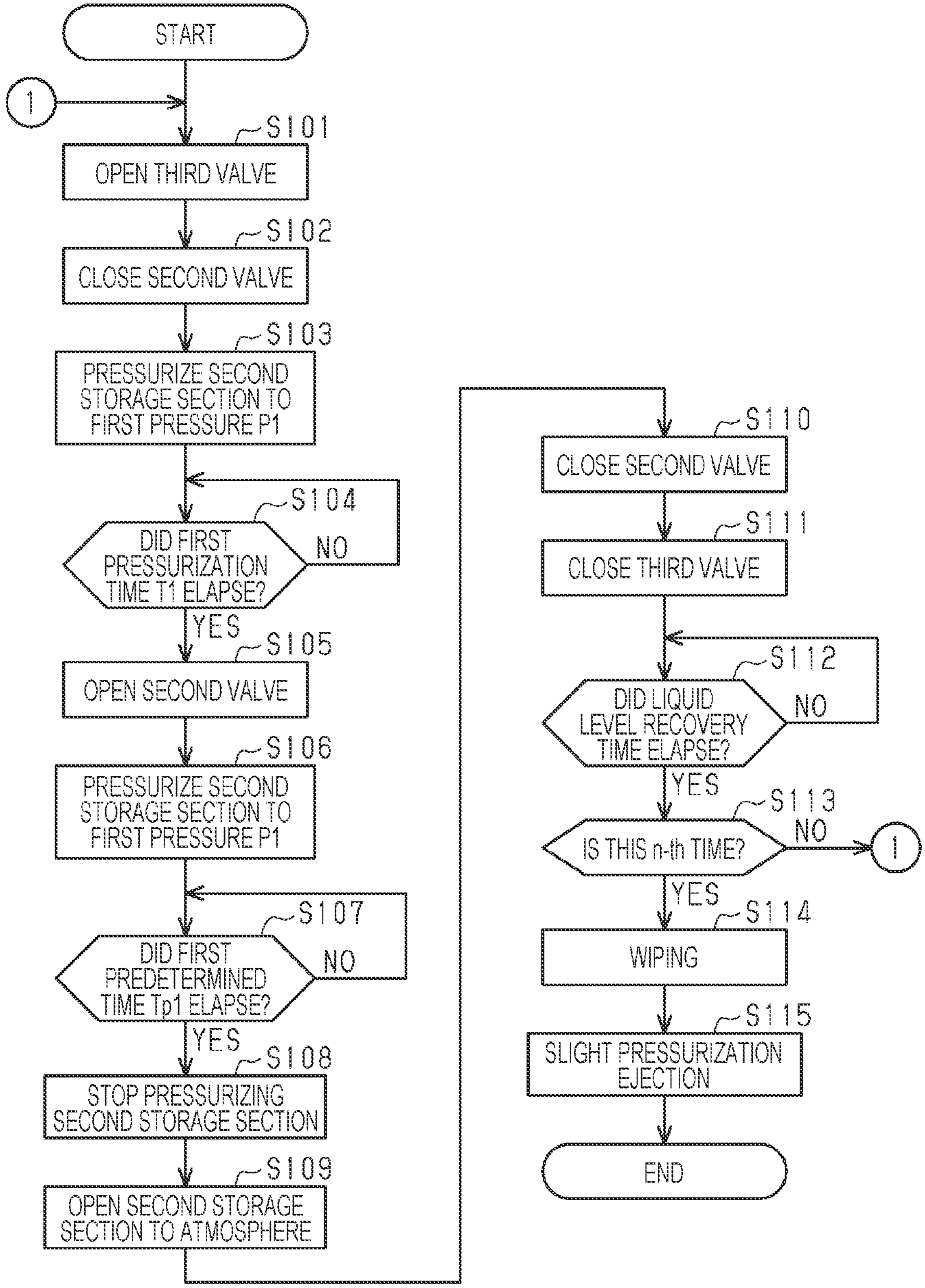
FIG. 8 is a flow chart illustrating a discharge circulation routine.

As illustrated in FIG. 8, the control section 19 opens the third valve 40 in step S101. In step S102, the control section 19 closes the second valve 38. In step S103, the control section 19 pressurizes the second storage section 35 to a first pressure P1. The control section 19 pressurizes the second storage section 35 to the first pressure P1 by driving the pressurization section 47. The first pressure P1 is a pressure higher than the Meniscus breaking pressure of the nozzle 22.

In step S104, the control section 19 determines whether or not a first pressurization time T1 elapsed after the second storage section 35 was pressurized in step S103. The first pressurization time T1 is the time required for the second storage section 35 to be pressurized to the first pressure P1.

Until the first pressurization time T1 elapses, step S104 is NO. The control section 19 waits until the first pressurization time T1 elapses. When the first pressurization time T1 elapses, step S104 is YES. The control section 19 shifts the processing to step S105. In step S105, the control section 19 opens the second valve 38. In step S106, the control section 19 pressurizes the second storage section 35 to the first pressure P1. In step S107, the control section 19 determines whether or not a first predetermined time Tp1 as a predetermined time elapsed after the second valve 38 was opened in step S105. The first predetermined time Tp1 is the time required for the second storage section 35 to be pressurized to the first pressure P1 in a state where the second valve 38 is open.

The first pressurization time T1 and the first predetermined time Tp1 may be set in advance, or may be changed each time the discharge circulation is performed. The control section 19 may make the first pressurization time T1 and the first predetermined time Tp1 longer when the environmental temperature is the first temperature than when the environmental temperature is the second temperature higher than the first temperature. The control section 19 may lengthen the first pressurization time T1 and the first predetermined time Tp1 as the environmental temperature is lowered. The control section 19 may adopt different first pressurization time T1 and first predetermined time Tp1 for each of the plurality of temperature ranges set in advance. In this case, even when the environmental temperatures are different, the same value is adopted as the first pressurization time T1 when the temperature is within the same temperature range. Even when the environmental temperatures are different, the same value is adopted as the first predetermined time Tp1 when the temperature is within the same temperature range. When the environmental temperatures are different and the temperatures are in different temperature ranges, different values are adopted as the first pressurization time T1. When the environmental temperatures are different and the temperatures are in different temperature ranges, different values are adopted as the first predetermined time Tp1.

Regarding the first pressurization time T1, the amount of liquid supplied from the second storage section 35 to the supply channel 37 is set to be within the specified range until the first pressurization time T1 elapses after the second storage section 35 is pressurized. Regarding the first predetermined time Tp1, the amount of liquid supplied from the second storage section 35 to the supply channel 37 is set to be within the specified range until the first predetermined time Tp1 elapses after the second storage section 35 is pressurized. The specified range of the amount of liquid is a range in which the amount of liquid required for discharge circulation can be supplied to the supply channel 37 and the amount of liquid stored in the second storage section 35 does not fall below the specified amount.

Until the first predetermined time Tp1 elapses, step S107 is NO. The control section 19 waits until the first predetermined time Tp1 elapses. Until the first predetermined time Tp1 elapses, step S107 is YES. The control section 19 shifts the processing to step S108. In step S108, the control section 19 stops pressurizing the second storage section 35. In step S109, the control section 19 opens the second storage section 35 to the atmosphere. In step S110, the control section 19 closes the second valve 38. In step S111, the control section 19 closes the third valve 40. In step S112, the control section 19 determines whether or not the liquid level recovery time elapsed after the second valve 38 was closed in step S110. The liquid level recovery time is the time required for the second liquid level 70 of the liquid in the second storage section 35 to reach the standard position.

Until the liquid level recovery time elapses, step S112 is NO. The control section 19 waits until the liquid level recovery time elapses. When the liquid level recovery time elapses, step S112 is YES. The control section 19 shifts the processing to step S113. In step S113, the control section 19 determines whether or not the processing of steps S101 to S112 is executed for the n-th time in the current discharge circulation routine.

When the current discharge circulation routine is executed at the timing when the liquid accommodation section 24 is first mounted on the mounting section 28, in step S113, the control section 19 uses a first predetermined number of times n1 as the n-th time to make a determination. The first predetermined number of times n1 may be less when the environmental temperature is lower than the predetermined temperature than when the environmental temperature is equal to or higher than the predetermined temperature. The first predetermined number of times n1 when the environmental temperature is lower than the predetermined temperature may be two. The first predetermined number of times n1 when the environmental temperature is equal to or higher than the predetermined temperature may be three.

When the current discharge circulation routine is executed during standby in which printing or the like is not performed, in step S113, the control section 19 uses a second predetermined number of times n2 as the n-th time to make a determination. The second predetermined number of times n2 may be less than the first predetermined number of times n1. When the first predetermined number of times n1 is two or three times, the second predetermined number of times n2 may be one.

Until the processing of steps S101 to S112 is executed for the n-th time in the current discharge circulation routine, step S113 is NO. The control section 19 performs the processing of steps S101 to S113 again. When the processing of steps S101 to S113 is executed for the n-th time in the current discharge circulation routine, step S113 is YES. The control section 19 shifts the processing to step S114. In step S114, the control section 19 performs wiping with the maintenance member 91. In step S115, the control section 19 executes the slight pressurization discharging routine, and then ends the discharge circulation routine. At least two of steps S108, S109, S110, and S111 may be performed simultaneously.

As illustrated in FIG. 2, in the discharge circulation, the control section 19 pressurizes the second storage section 35 and opens the second valve 38 in a state where the collection channel 39 is open. Therefore, the liquid flows into the supply channel 37 from inside the second storage section 35. The liquid is supplied to the liquid ejecting head 23 through the supply channel 37. A part of the liquid supplied to the liquid ejecting head 23 is ejected from the nozzles 22. The liquid is collected from the liquid ejecting head 23 to the collection channel 39. The liquid is returned to the first storage section 33 through the collection channel 39.

In the discharge circulation, bubbles accumulated in the liquid ejecting head 23, the supply channel 37, and the collection channel 39 flow into the first storage section 33 together with the liquid. As a result, bubbles accumulated in the liquid ejecting head 23, the supply channel 37, and the collection channel 39 are reduced.

Slight Pressurization Discharging

The slight pressurization discharging routine will be described with reference to FIG. 9. Slight pressurization discharging may be executed when execution of slight pressurization discharging is instructed.

Figure 9:
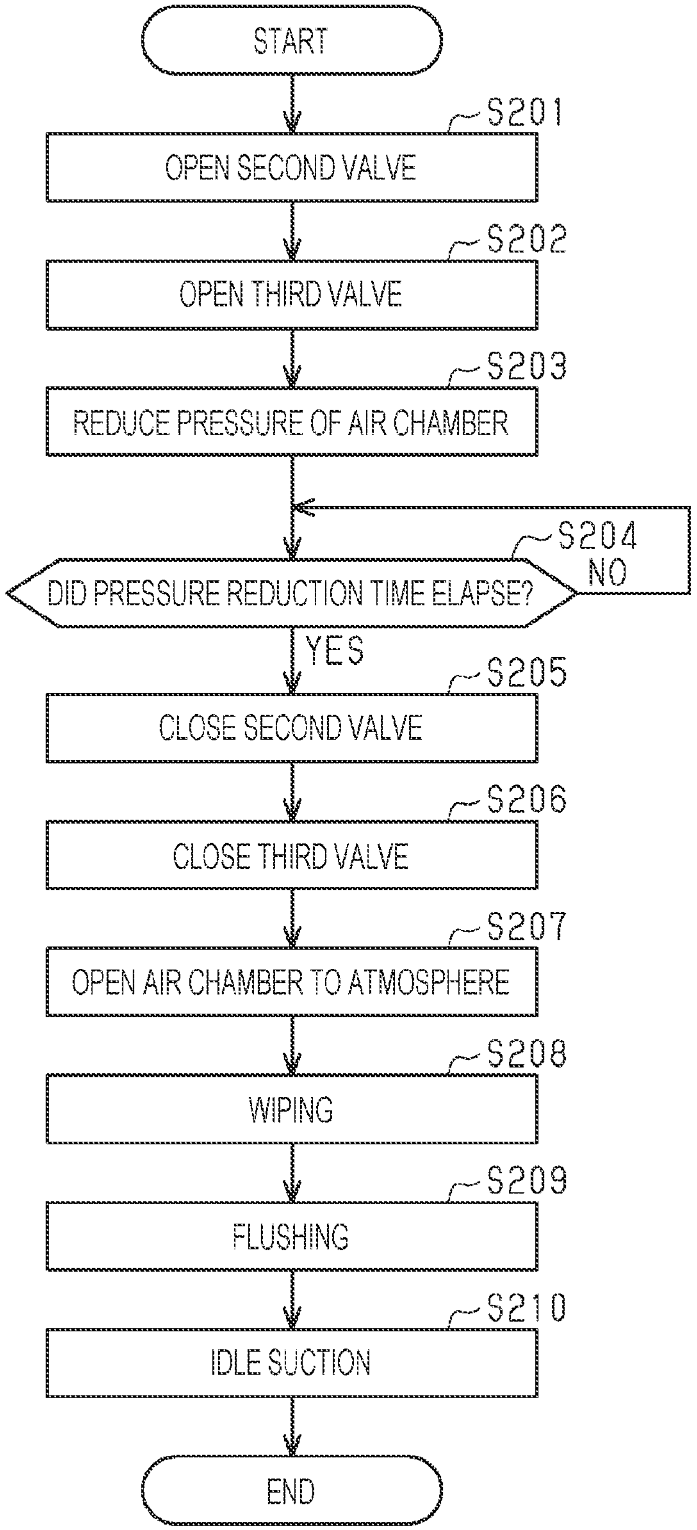
FIG. 9 is a flow chart illustrating a slight pressurization discharging routine.

As illustrated in FIG. 9, the control section 19 opens the second valve 38 in step S201. In step S202, the control section 19 opens the third valve 40. In step S203, the control section 19 reduces the pressure of the air chamber 53. In step S204, the control section 19 determines whether or not the pressure reduction time elapsed after the pressure in the air chamber 53 was reduced. The pressure reduction time is the time required to deform the flexible member 42 and maximize the volume of the liquid chamber 41.

Until the pressure reduction time elapses, step S204 becomes NO. The control section 19 waits until the pressure reduction time elapses. When the pressure reduction time elapses, step S204 is YES. The control section 19 shifts the processing to step S205. In step S205, the control section 19 closes the second valve 38. In step S206, the control section 19 closes the third valve 40. In step S207, the control section 19 opens the air chamber 53 to the atmosphere. In step S208, the control section 19 performs wiping with the maintenance member 91. In step S209, the control section 19 performs flushing with the maintenance member 91. In step S210, the control section 19 ends the slight pressurization discharging routine after idle suction is performed by the maintenance member 91.

Here, steps S201 and S202 may each be performed at the same time as step S203 or after step S203. In addition, each of steps S205 and S206 may be performed during step S203, may be performed at the same time as the end of step S203, or may be performed after the end of step S203.

As illustrated in FIG. 2, in the slight pressurization discharging, the control section 19 opens the supply channel 37 and the collection channel 39 by opening the second valve 38 and the third valve 40. The control section 19 reduces the pressure of the air chamber 53 to deform the flexible member 42 and increase the volume of the liquid chamber 41. The liquid flows into the liquid chamber 41 from the first storage section 33 via the collection channel 39, and the liquid flows into the liquid chamber 41 from the second storage section 35 via the supply channel 37 and the collection channel 39.

When the volume of the liquid chamber 41 reaches the maximum, the control section 19 closes the supply channel 37 by closing the second valve 38. The control section 19 closes the collection channel 39 by closing the third valve 40. Since the deformation of the flexible member 42 due to the pressure reduction in the air chamber 53 is released, the volume of the liquid chamber 41 is reduced. Accordingly, the liquid discharge apparatus 11 ejects the liquid from the nozzle 22 by the pressurization mechanism 57. The pressurization mechanism 57 pressurizes the liquid chamber 41 with a pressure that breaks the Meniscus formed in the nozzle 22. The amount of liquid ejected from the liquid ejecting head 23 by slight pressurization discharging is smaller than the amount of liquid ejected from the liquid ejecting head 23 by discharge circulation.

Non-Discharge Circulation

The non-discharge circulation routine will be described with reference to FIG. 10. The non-discharge circulation may be executed after the filling circulation and the discharge circulation are executed and during standby in which printing or the like is not performed. The non-discharge circulation may be executed periodically.

Figure 10:
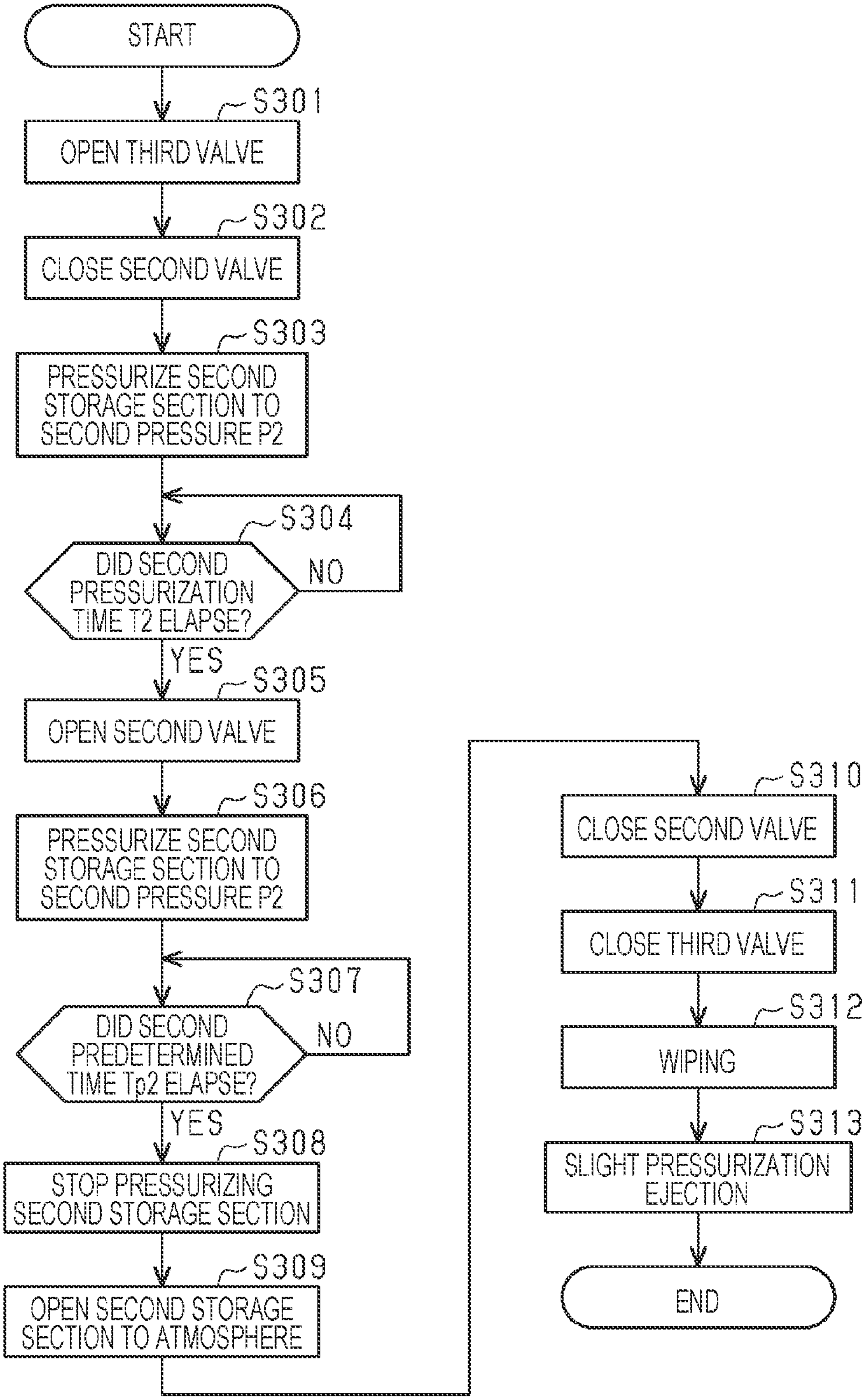
FIG. 10 is a flow chart illustrating a non-discharge circulation routine.

As illustrated in FIG. 10, the control section 19 opens the third valve 40 in step S301. In step S302, the control section 19 closes the second valve 38. In step S303, the control section 19 pressurizes the second storage section 35 to a second pressure P2. The control section 19 pressurizes the second storage section 35 to the second pressure P2 by driving the pressurization section 47. The second pressure P2 is a pressure lower than the Meniscus breaking pressure of the nozzle 22. The second pressure P2 is a pressure lower than the first pressure P1 used in the discharge circulation.

In step S304, the control section 19 determines whether or not a second pressurization time T2 elapsed after the second storage section 35 was pressurized in step S303. The second pressurization time T2 is the time required for the second storage section 35 to be pressurized to the second pressure P2.

Until the second pressurization time T2 elapses, step S304 is NO. The control section 19 waits until the second pressurization time T2 elapses. When the second pressurization time T2 elapses, step S304 is YES. The control section 19 shifts the processing to step S305. In step S305, the control section 19 opens the second valve 38. In step S306, the control section 19 pressurizes the second storage section 35 to the second pressure P2. In step S307, the control section 19 determines whether or not a second predetermined time Tp2 as a predetermined time elapsed after the second valve 38 was opened in step S305. The second predetermined time Tp2 is the time required for the second storage section 35 to be pressurized to the second pressure P2 in a state where the second valve 38 is open.

The second pressurization time T2 and the second predetermined time Tp2 may be set in advance, or may be changed each time the non-discharge circulation is performed. The second pressurization time T2 may be shorter than the first pressurization time T1 used in the discharge circulation. The second predetermined time Tp2 may be longer than the first predetermined time Tp1 used in the discharge circulation.

The control section 19 may make the second pressurization time T2 and the second predetermined time Tp2 longer when the environmental temperature is the first temperature than when the environmental temperature is the second temperature higher than the first temperature. The control section 19 may lengthen the second pressurization time T2 and the second predetermined time Tp2 as the environmental temperature is lowered. The control section 19 may adopt the number of seconds obtained by adding 37.5 to the number obtained by multiplying the environmental temperature by 0.5 as either the second pressurization time T2 or the second predetermined time Tp2. The control section 19 may adopt different second pressurization time T2 and second predetermined time Tp2 for each of the plurality of temperature ranges set in advance. In this case, even when the environmental temperatures are different, the same value is adopted as the second pressurization time T2 when the temperature is within the same temperature range. Even when the environmental temperatures are different, the same value is adopted as the second predetermined time Tp2 when the temperature is within the same temperature range. When the environmental temperatures are different and the temperatures are in different temperature ranges, different values are adopted as the second pressurization time T2. When the environmental temperatures are different and the temperatures are in different temperature ranges, different values are adopted as the second predetermined time Tp2.

Regarding the second pressurization time T2, the amount of liquid supplied from the second storage section 35 to the supply channel 37 is set to be within the specified range until the second pressurization time T2 elapses after the second storage section 35 is pressurized. Regarding the second predetermined time Tp2, the amount of liquid supplied from the second storage section 35 to the supply channel 37 is set to be within the specified range until the second predetermined time Tp2 elapses after the second storage section 35 is pressurized. The specified range of the amount of liquid is a range in which the amount of liquid required for non-discharge circulation can be supplied to the supply channel 37 and the amount of liquid stored in the second storage section 35 does not fall below the specified amount.

Until the second predetermined time Tp2 elapses, step S307 is NO. The control section 19 waits until the second predetermined time Tp2 elapses. Until the second predetermined time Tp2 elapses, step S307 is YES. The control section 19 shifts the processing to step S308. In step S308, the control section 19 stops pressurizing the second storage section 35. In step S309, the control section 19 opens the second storage section 35 to the atmosphere. In step S310, the control section 19 closes the second valve 38. At step S311, the control section 19 closes the third valve 40. In step S312, the control section 19 performs wiping with the maintenance member 91. In step S313, the control section 19 executes the slight pressurization discharging routine, and then ends the non-discharge circulation routine. At least two of steps S308, S309, S310, and S311 may be performed simultaneously.

As illustrated in FIG. 2, in the non-discharge circulation, the control section 19 pressurizes the second storage section 35 and opens the second valve 38 in a state where the collection channel 39 is open. Therefore, the liquid flows into the supply channel 37 from inside the second storage section 35. The liquid is supplied to the liquid ejecting head 23 through the supply channel 37. Discharge of the liquid from the nozzles 22 is suppressed. The liquid is collected from the liquid ejecting head 23 to the collection channel 39. The liquid is returned to the first storage section 33 through the collection channel 39.

In the non-discharge circulation, the liquid stored in the second storage section 35 is stirred by making the liquid flow from the second storage section 35 into the supply channel 37. In the non-discharge circulation, the liquid stored in the first storage section 33 is stirred by flowing the liquid from the collection channel 39 into the first storage section 33.

Filling Circulation

The filling circulation routine will be described with reference to FIG. 11. The filling circulation may be executed at the timing when the first liquid level 66 in the first storage section 33 and the second liquid level 70 in the second storage section 35 are at the standard positions after the liquid accommodation section 24 is first mounted on the mounting section 28.

Figure 11:
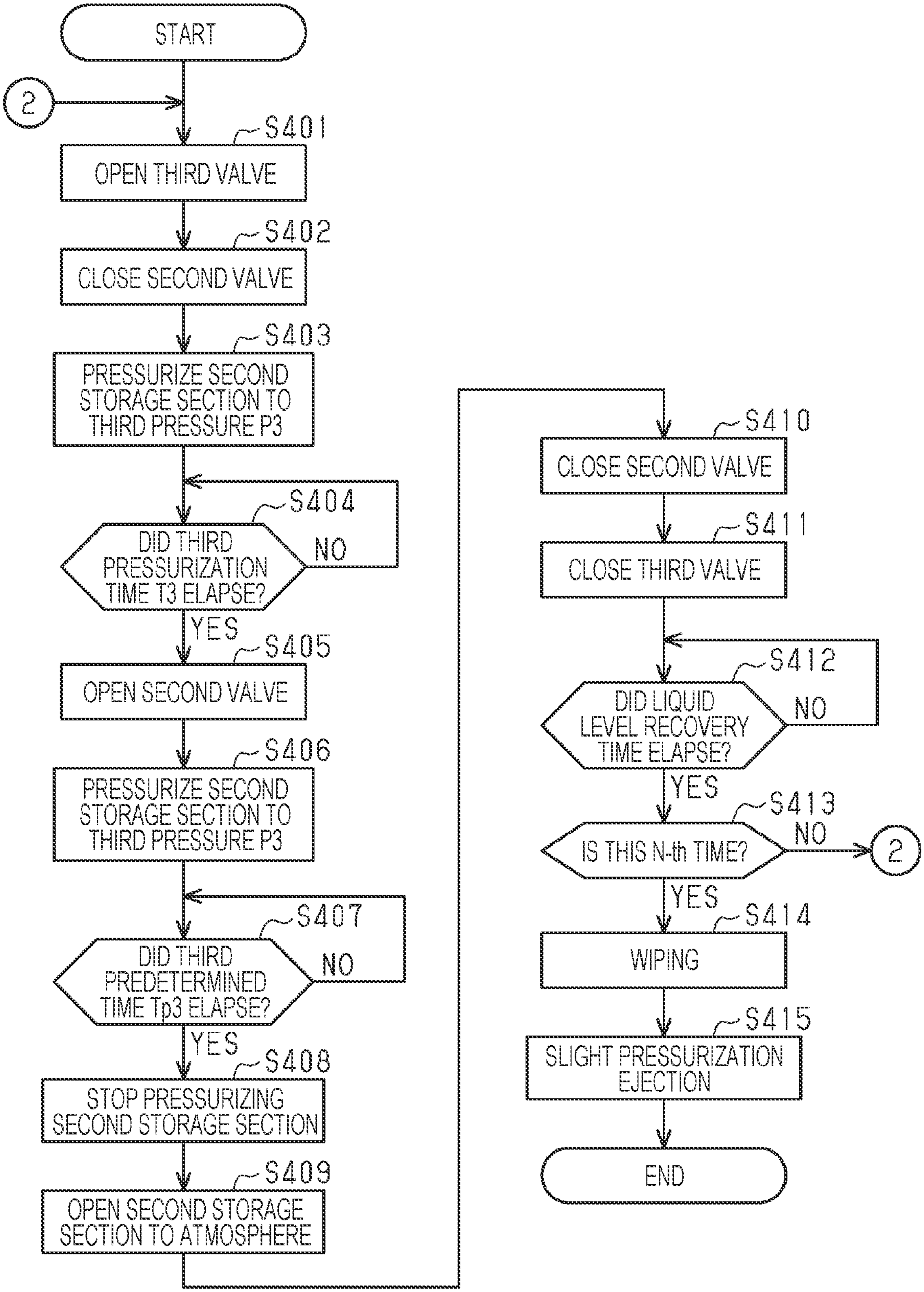
FIG. 11 is a flow chart illustrating a filling circulation routine.

As illustrated in FIG. 11, the control section 19 opens the third valve 40 in step S401. At step S402, the control section 19 closes the second valve 38. In step S403, the control section 19 pressurizes the second storage section 35 to a third pressure P3. The control section 19 pressurizes the second storage section 35 to the third pressure P3 by driving the pressurization section 47. The third pressure P3 is lower than the first pressure P1 used in the discharge circulation and higher than the second pressure P2 used in the non-discharge circulation.

In step S404, the control section 19 determines whether or not a third pressurization time T3 elapsed after the second storage section 35 was pressurized in step S403. The third pressurization time T3 is the time required for the second storage section 35 to be pressurized to the third pressure P3.

Until the third pressurization time T3 elapses, step S404 is NO. The control section 19 waits until the third pressurization time T3 elapses. When the third pressurization time T3 elapses, step S404 is YES. The control section 19 shifts the processing to step S405. In step S405, the control section 19 opens the second valve 38. In step S406, the control section 19 pressurizes the second storage section 35 to the third pressure P3. In step S407, the control section 19 determines whether or not a third predetermined time Tp3 as a predetermined time elapsed after the second valve 38 was opened in step S405. The third predetermined time Tp3 is the time required for the second storage section 35 to be pressurized to the third pressure P3 in a state where the second valve 38 is open.

The third pressurization time T3 and the third predetermined time Tp3 may be set in advance or may be variable. The third pressurization time T3 may be shorter than the first pressurization time T1 used in the discharge circulation. The third pressurization time T3 may be the same as or different from the second pressurization time T2 used in non-discharge circulation. The third predetermined time Tp3 may be longer than the first predetermined time Tp1 used in the discharge circulation. The third predetermined time Tp3 may be the same as or different from the second predetermined time Tp2 used in the non-discharge circulation.

The control section 19 may make the third pressurization time T3 and the third predetermined time Tp3 longer when the environmental temperature is the first temperature than when the environmental temperature is the second temperature higher than the first temperature. The control section 19 may lengthen the third pressurization time T3 and the third predetermined time Tp3 as the environmental temperature is lowered. The control section 19 may adopt different third pressurization time T3 and third predetermined time Tp3 for each of the plurality of temperature ranges set in advance. In this case, even when the environmental temperatures are different, the same value is adopted as the third pressurization time T3 when the temperature is within the same temperature range. Even when the environmental temperatures are different, the same value is adopted as the third predetermined time Tp3 when the temperature is within the same temperature range. When the environmental temperatures are different and the temperatures are in different temperature ranges, different values are adopted as the third pressurization time T3. When the environmental temperatures are different and the temperatures are in different temperature ranges, different values are adopted as the third predetermined time Tp3.

Regarding the third pressurization time T3, the amount of liquid supplied from the second storage section 35 to the supply channel 37 is set to be within the specified range until the third pressurization time T3 elapses after the second storage section 35 is pressurized. Regarding the third predetermined time Tp3, the amount of liquid supplied from the second storage section 35 to the supply channel 37 is set to be within the specified range until the third predetermined time Tp3 elapses after the second storage section 35 is pressurized. The specified range of the amount of liquid is a range in which the amount of liquid required for filling circulation can be supplied to the supply channel 37 and the amount of liquid stored in the second storage section 35 does not fall below the specified amount.

Until the third predetermined time Tp3 elapses, step S407 is NO. The control section 19 waits until the third predetermined time Tp3 elapses. Until the third predetermined time Tp3 elapses, step S407 is YES. The control section 19 shifts the processing to step S408. In step S408, the control section 19 stops pressurizing the second storage section 35. In step S409, the control section 19 opens the second storage section 35 to the atmosphere. At step S410, the control section 19 closes the second valve 38. At step S411, the control section 19 closes the third valve 40. In step S412, the control section 19 determines whether or not the liquid level recovery time elapsed after the second valve 38 was closed in step S110. The liquid level recovery time is the time required for the second liquid level 70 of the liquid in the second storage section 35 to reach the standard position.

Until the liquid level recovery time elapses, step S412 is NO. The control section 19 waits until the liquid level recovery time elapses. When the liquid level recovery time elapses, step S412 is YES. The control section 19 shifts the processing to step S413. In step S413, the control section 19 determines whether or not the processing of steps S401 to S412 is executed for the N-th time in the current filling circulation routine. The control section 19 uses the preset third predetermined number of times n3 as the N-th time to make a determination. The third predetermined number of times n3 may be two.

Until the processing of steps S401 to S412 is executed for the N-th time in the current filling circulation routine, step S413 is NO. The control section 19 performs the processing of steps S401 to S413 again. When the processing of steps S401 to S413 is executed for the N-th time in the current filling circulation routine, step S413 is YES. The control section 19 shifts the processing to step S414. In step S414, the control section 19 performs wiping with the maintenance member 91. In step S415, the control section 19 executes the slight pressurization discharging routine, and then ends the discharge circulation routine. At least two of steps S408, S409, S410, and S411 may be performed simultaneously.

As illustrated in FIG. 2, in the filling circulation, the control section 19 pressurizes the second storage section 35 and opens the second valve 38 in a state where the collection channel 39 is open. Therefore, the liquid flows into the supply channel 37 from inside the second storage section 35. The liquid is supplied to the liquid ejecting head 23 through the supply channel 37. A part of the liquid supplied to the liquid ejecting head 23 is ejected from the nozzles 22. The liquid is collected from the liquid ejecting head 23 to the collection channel 39. The liquid is returned to the first storage section 33 through the collection channel 39.

In the filling circulation, the liquid flows into the supply channel 37, the liquid ejecting head 23, and the collection channel 39. As a result, the circulation route 11*a* is filled with the liquid while the liquid is ejected from the nozzles 22.

Action of Embodiment

The action of the present embodiment will be described.

In the discharge circulation, the control section 19 closes the communication path 34 by the first valve 36 and closes the supply channel 37 by the second valve 38. The control section 19 pressurizes the inside of the second storage section 35 with the pressurization section 47 to the first pressure P1. The control section 19 closes the communication path 34 and closes the supply channel 37, pressurizes the inside of the second storage section 35 to the first pressure P1, and then opens the supply channel 37 by the second valve 38. Accordingly, the control section 19 can execute the discharge circulation in which the liquid is circulated in the circulation route 11*a* while ejecting the liquid from the nozzles 22.

In the non-discharge circulation, the control section 19 closes the communication path 34 by the first valve 36 and closes the supply channel 37 by the second valve 38. The control section 19 pressurizes the inside of the second storage section 35 with the pressurization section 47 to the second pressure P2 lower than the first pressure P1. The control section 19 closes the communication path 34 and closes the supply channel 37, pressurizes the inside of the second storage section 35 to the second pressure P2, and then opens the supply channel 37 by the second valve 38. Accordingly, the control section 19 can execute the non-discharge circulation in which the liquid is circulated in the circulation route 11*a* without ejecting the liquid from the nozzles 22.

In the filling circulation, the control section 19 closes the communication path 34 by the first valve 36 and closes the supply channel 37 by the second valve 38. The control section 19 pressurizes the inside of the second storage section 35 with the pressurization section 47 to the third pressure P3, which is a pressure lower than the first pressure P1 and higher than the second pressure P2. The control section 19 closes the communication path 34 and closes the supply channel 37, pressurizes the inside of the second storage section 35 to the third pressure P3, and then opens the supply channel 37 by the second valve 38. Accordingly, the control section 19 can execute the filling circulation in which the inside of the circulation route 11*a* is filled with the liquid while ejecting the liquid from the nozzles 22.

In the discharge circulation, the non-discharge circulation, and the filling circulation, the pressure in the second storage section 35 becomes higher than the pressure in the first storage section 33 as the pressurization section 47 pressurizes the second storage section 35. Accordingly, the first valve 36 closes the communication path 34.

In the discharge circulation, the non-discharge circulation, and the filling circulation, the control section 19 closes the supply channel 37 by the second valve 38. The control section 19 closes the communication path 34 and closes the supply channel 37, pressurizes the inside of the second storage section 35, and then opens the supply channel 37 by the second valve 38. The control section 19 pressurizes the inside of the second storage section 35 while the second valve 38 is closed. As a result, the second storage section 35 can be pressurized more quickly than when the second storage section 35 is pressurized in a state where the second valve 38 open.

In the discharge circulation, the non-discharge circulation, and the filling circulation, the control section 19 opens the supply channel 37 by the second valve 38, and then pressurizes the inside of the second storage section 35 with the pressurization section 47. As a result, the pressure drop in the second storage section 35 due to the opening of the supply channel 37 by the second valve 38 is reduced. That is, the control section 19 opens the supply channel 37 by the second valve 38, and then pressurizes the inside of the second storage section 35 with the pressurization section 47 such that the pressure drop in the second storage section 35 due to the opening of the supply channel 37 by the second valve 38 is reduced.

In the discharge circulation, the non-discharge circulation, and the filling circulation, the control section 19 pressurizes the second storage section 35 and opens the second valve 38 in a state where the collection channel 39 is open. Therefore, the liquid flowing through the collection channel 39 flows into the first storage section 33 via the inlet 33*a*. The liquid stored in the first storage section 33 is stirred by the inflow of the liquid from the inlet 33*a*.

In the discharge circulation, the non-discharge circulation, and the filling circulation, the control section 19 closes the supply channel 37 after a predetermined time elapsed in a state where the supply channel 37 is opened by the second valve 38. The lower the environmental temperature, the higher the viscosity of the liquid. Therefore, there is a concern that the flow rate of the liquid flowing through the supply channel 37 varies depending on the environmental temperature as the supply channel 37 is opened by the second valve 38. The control section 19 makes the predetermined time longer when the environmental temperature detected by the temperature detection section 80 is the first temperature than when the environmental temperature is the second temperature higher than the first temperature. Therefore, it is possible to suppress an increase or decrease in the flow rate of the liquid flowing through the circulation route 11*a* due to changes in the environmental temperature.

Effect of Embodiment

The effect of the present embodiment will be described.

1. The control section 19 can execute discharge circulation and non-discharge circulation. A plurality of pieces of processing such as discharge circulation and non-discharge circulation can be performed using the common circulation route 11*a*. Therefore, it is possible to suppress complication of the route through which the liquid flows compared to the case where a plurality of pieces of processing are performed using different routes.

Furthermore, in the discharge circulation and the non-discharge circulation, the communication path 34 is closed by the first valve 36 and the supply channel 37 is closed by the second valve 38 before the supply channel 37 is opened by the second valve 38, and at the same time, the inside of the second storage section 35 is pressurized by the pressurization section 47. Therefore, compared to the case where the inside of the second storage section 35 is pressurized after the supply channel 37 is opened by the second valve 38, the liquid can be quickly circulated through the circulation route 11*a* in the discharge circulation and the non-discharge circulation. Therefore, the time required for the plurality of pieces of processing such as discharge circulation and non-discharge circulation can be shortened.

2. The control section 19 can execute filling circulation. The discharge circulation, the non-discharge circulation, and the filling circulation, which is processing different from these, can be performed using the common circulation route 11*a*. Therefore, it is possible to further suppress complication of the route through which the liquid flows. Furthermore, in the filling circulation, the communication path 34 is closed by the first valve 36 and the supply channel 37 is closed by the second valve 38 before the supply channel 37 is opened by the second valve 38, and at the same time, the inside of the second storage section 35 is pressurized by the pressurization section 47. Therefore, compared to the case where the inside of the second storage section 35 is pressurized after the supply channel 37 is opened by the second valve 38, the liquid can be quickly circulated through the circulation route 11*a* in the filling circulation. Therefore, the time required for filling circulation can be shortened.

3. The control section 19 opens the supply channel 37 by the second valve 38, and then pressurizes the inside of the second storage section 35 with the pressurization section 47 such that the pressure drop in the second storage section 35 due to the opening of the supply channel 37 by the second valve 38 is reduced. Therefore, compared to the case where the inside of the second storage section 35 is not pressurized by the pressurization section 47 after the supply channel 37 is opened by the second valve 38, it is possible to reduce the pressure drop in the second storage section 35 due to the opening of the supply channel 37 by the second valve 38. Therefore, the pressure in the second storage section 35 necessary for circulating the liquid in the circulation route 11*a* and ejecting the liquid from the nozzle 22 can be maintained.

4. The first valve 36 is a one-way valve, and closes the communication path 34 as the second storage section 35 is pressurized by the pressurization section 47. Therefore, a drive mechanism for driving the first valve 36 becomes unnecessary. Therefore, it is possible to suppress an increase in the number of components mounted on the liquid discharge apparatus 11.

5. The lower the environmental temperature, the higher the viscosity of the liquid. Therefore, there is a concern that the flow rate of the liquid flowing through the supply channel 37 varies depending on the environmental temperature as the supply channel 37 is opened by the second valve 38. The control section 19 closes the supply channel 37 after a predetermined time elapsed in a state where the supply channel 37 is opened by the second valve 38. The control section 19 makes the predetermined time longer when the environmental temperature detected by the temperature detection section 80 is the first temperature than when the environmental temperature is the second temperature higher than the first temperature. Therefore, it is possible to suppress an increase or decrease in the flow rate of the liquid flowing through the circulation route 11*a* due to changes in the environmental temperature.

6. In the first storage section 33, the inlet 33*a* into which the liquid in the collection channel 39 flows is formed. The inlet 33*a* is positioned below the center of the first storage section 33. Therefore, the liquid flowing through the collection channel 39 flows into the first storage section 33 via the inlet 33*a*. Since the inlet 33*a* is positioned below the center of the first storage section 33, the liquid stored in the first storage section 33 is stirred by the inflow of the liquid from the inlet 33*a*. Therefore, sedimentation in the first storage section 33 can be recovered.

7. The control section 19 can switch between closing and opening of the collection channel 39 by the third valve 40. Therefore, it is possible to switch whether or not the liquid flows from the collection channel 39 into the first storage section 33.

Modification Example

The present embodiment can be modified and implemented as follows. The present embodiment and the following modification examples can be implemented in combination with each other within a technically consistent range.

The formation position of the supply port 35*a* in the second storage section 35 is not limited to the second bottom 68*b*. For example, the supply port 35*a* may be formed on a side wall that couples the ceiling of the second storage section 35 and the second bottom 68*b*. The formation position of the supply port 35*a* in the second storage section 35 is not limited to below the center of the second storage section 35. For example, the supply port 35*a* may be formed on the ceiling of the second storage section 35.

The formation position of the inlet 33*a* in the first storage section 33 is not limited to the first bottom 65*b*. For example, the inlet 33*a* may be formed on a side wall that couples the ceiling 65*a* of the first storage section 33 and the first bottom 65*b*. The formation position of the inlet 33*a* in the first storage section 33 is not limited to below the center of the first storage section 33. For example, the inlet 33*a* may be formed in the ceiling 65*a*.

In the slight pressurization discharging, the liquid in the liquid chamber 41 may be pressurized by pressing the flexible member 42 with the spring 54. In this case, the control section 19 reduces the pressure of the air chamber 53 to increase the volume of the liquid chamber 41, and then opens the air chamber 53 to the atmosphere. When the air chamber 53 reaches atmospheric pressure, the spring 54 pushes the liquid in the liquid chamber 41 and ejects the liquid from the liquid ejecting head 23.

The control section 19 may omit the wiping processing in at least part of the discharge circulation, the non-discharge circulation, and the filling circulation. The control section 19 may omit the slight pressurization discharging processing in at least part of the discharge circulation, the non-discharge circulation, and the filling circulation.

The control section 19 may omit at least one of step S112 and step S113 in discharge circulation.

The control section 19 may omit at least one of step S412 and step S413 in filling circulation.

The control section 19 may adopt a preset value for at least one of the first pressurization time T1 in discharge circulation, the second pressurization time T2 in non-discharge circulation, and the third pressurization time T3 in filling circulation.

The control section 19 may adopt a preset value for at least one of the first predetermined time Tp1 in discharge circulation, the second predetermined time Tp2 in non-discharge circulation, and the third predetermined time Tp3 in filling circulation. The liquid discharge apparatus 11 may omit the temperature detection section 80.

The third valve 40 may be omitted from the liquid discharge apparatus 11. The control section 19 may omit the processing related to the third valve 40 in the discharge circulation, the non-discharge circulation, and the filling circulation. The collection channel 39 may always be open.

The control section 19 may omit the processing of step S106 and step S107 in discharge circulation. The control section 19 may omit the processing of step S306 and step S307 in non-discharge circulation. The control section 19 may omit step S406 and step S407 in filling circulation.

The control section 19 may perform filling circulation for filling the supply channel 37 with the liquid using a route different from the circulation route 11*a* instead of the filling circulation routine illustrated in FIG. 11.

The first valve 36 may be a control valve of which opening and closing can be controlled by the control section 19. The control section 19 may block the communication path 34 by closing the first valve 36 before pressurizing the inside of the second storage section 35.

The liquid ejecting head 23 may have a plurality of pressure chambers individually communicating with the plurality of nozzles 22, a common liquid chamber communicating with the plurality of pressure chambers, and a filter chamber accommodating a filter. The first coupling section 44 and the second coupling section 45 are coupled to at least one of the pressure chamber, the common liquid chamber, and the filter chamber. For example, when the first coupling section 44 and the second coupling section 45 are coupled to the filter chamber, the liquid discharge apparatus 11 can collect bubbles trapped in the filter together with the liquid into the first storage section 33 by performing discharge circulation.

The control section 19 may reduce the pressure of the inside of the first storage section 33 when the liquid is caused to flow into the first storage section 33 from the collection channel 39. For example, the atmosphere open path 50 may be coupled to the air channel 55. By driving the pressurization section 47 to rotate forward, the inside of the second storage section 35 may be pressurized, and the pressure of the inside of the first storage section 33 may be reduced via the air channel 55 and the atmosphere open path 50.

The first storage section 33 and the second storage section 35 may be integrally formed.

The flexible member 42 may be formed of a rubber film, an elastomer film, a film, or the like.

The liquid chamber 41 may be provided in the supply channel 37. The pressurization mechanism 57 may pressurize the liquid chamber 41 provided in the supply channel 37.

A diaphragm pump, a piston pump, a gear pump, or the like may be used as the pressurization section 47.

The flow-in section 60 and the flow-out section 30 may have a plurality of channels. For example, one channel may allow the liquid to flow from the liquid accommodation section 24 to the first storage section 33 and the other channel may allow air to flow from the first storage section 33 to the liquid accommodation section 24.

The liquid ejecting head 23 may discharge the liquid in a horizontal posture in which the nozzle surface 21 is horizontal to perform printing on the medium 12. The liquid ejecting head 23 may be provided to be able to change the posture between a horizontal posture and an inclined posture.

The liquid discharge apparatus 11 may be provided with an atmosphere open path for opening the second storage section 35 to the atmosphere separately from the pressurization channel 51.

The liquid discharge apparatus 11 may be a liquid discharge apparatus which ejects or discharges a liquid other than the ink. Examples of a state of the liquid discharged as a minute amount of liquid droplets from the liquid discharge apparatus include grain-like, teardrop-like, and thread-like tails. The liquid referred here may be any material as long as the liquid can be discharged from the liquid discharge apparatus. For example, the liquid may be in any state as long as the substance is in a liquid phase, and may be a fluid body, such as a liquid material having high or low viscosity, sol, gel water, other inorganic solvent, organic solvent, solution, liquid resin, or liquid metal (metallic melt). The liquid may be not only a liquid as one state of a substance but also a substance in which particles of a functional material composed of a solid material, such as a pigment and metal particles are dissolved, dispersed or mixed in a solvent, and the like. Representative examples of the liquid include ink, liquid crystal, and the like as described in the above embodiment. Here, the ink includes various types of liquid compositions, such as general water-based ink and oil-based ink, gel ink, hot melt ink and the like. A specific example of the liquid discharge apparatus includes an apparatus which discharges the liquid containing dispersed or dissolved materials, such as electrode materials or coloring materials used for manufacturing liquid crystal displays, electroluminescence displays, surface emitting displays, or color filters. The liquid discharge apparatus may be an apparatus which discharges a bioorganic material used for biochip manufacturing, an apparatus which discharges a liquid that serves as a sample used as a precision pipette, a textile printing apparatus, a micro dispenser, or the like. The liquid discharge apparatus may be an apparatus which discharges lubricating oil pinpointing to a precision machine, such as a timepiece or a camera, or an apparatus which discharges a transparent resin liquid, such as an ultraviolet curing resin for forming a micro hemispherical lens, an optical lens or the like used for an optical communication element or the like, onto the substrate. The liquid discharge apparatus may be an apparatus which discharges an etching solution, such as acid or alkali to etch a substrate or the like.

APPENDIX

Hereinafter, the technical idea grasped from the embodiment and the modification examples described above and the action effects thereof will be described.

A. In a liquid discharge apparatus, there are provided a liquid ejecting head configured to eject a liquid from a nozzle; a first storage section that stores the liquid; a second storage section that communicates with the first storage section via a communication path and is supplied with the liquid from the first storage section; a supply channel that supplies the liquid from the second storage section to the liquid ejecting head; a collection channel that collects the liquid from the liquid ejecting head to the first storage section; a first valve provided in the communication path and configured to open and close the communication path; a second valve provided in the supply channel and configured to open and close the supply channel; a pressurization section that pressurizes the inside of the second storage section; and a control section, in which the first storage section, the supply channel, the liquid ejecting head, the collection channel, the second storage section, and the communication path form a circulation route through which the liquid circulates, and the control section is configured to execute discharge circulation in which the communication path is closed by the first valve and the supply channel is closed by the second valve, the inside of the second storage section is pressurized to a first pressure by the pressurization section, and then the supply channel is opened by the second valve to perform circulation of the liquid in the circulation route while discharging the liquid from the nozzle, and non-discharge circulation in which the communication path is closed by the first valve and the supply channel is closed by the second valve, the inside of the second storage section is pressurized to a second pressure lower than the first pressure by the pressurization section, and then the supply channel is opened by the second valve to perform circulation of the liquid in the circulation route without discharging the liquid from the nozzle.

According to this configuration, a plurality of pieces of processing such as discharge circulation and non-discharge circulation can be performed using the common circulation route. Therefore, it is possible to suppress complication of the route through which the liquid flows compared to the case where a plurality of pieces of processing are performed using different routes. Furthermore, according to this configuration, in the discharge circulation and the non-discharge circulation, the communication path is closed by the first valve and the supply channel is closed by the second valve before the supply channel is opened by the second valve, and at the same time, the inside of the second storage section is pressurized by the pressurization section. Therefore, compared to the case where the inside of the second storage section is pressurized after the supply channel is opened by the second valve, the liquid can be quickly circulated through the circulation route in the discharge circulation and the non-discharge circulation. Therefore, the time required for the plurality of pieces of processing such as discharge circulation and non-discharge circulation can be shortened.

B. In the liquid discharge apparatus, the control section is configured to execute filling circulation in which the communication path is closed by the first valve and the supply channel is closed by the second valve, the inside of the second storage section is pressurized to a third pressure lower than the first pressure and higher than the second pressure by the pressurization section, and then the supply channel is opened by the second valve to perform filling of the liquid in the circulation route while discharging the liquid from the nozzle.

According to this configuration, the discharge circulation, the non-discharge circulation, and the filling circulation, which is processing different from these, can be performed using the common circulation route. Therefore, it is possible to further suppress complication of the route through which the liquid flows. Furthermore, according to this configuration, in the filling circulation, the communication path is closed by the first valve and the supply channel is closed by the second valve before the supply channel is opened by the second valve, and at the same time, the inside of the second storage section is pressurized by the pressurization section. Therefore, compared to the case where the inside of the second storage section is pressurized after the supply channel is opened by the second valve, the liquid can be quickly circulated through the circulation route in the filling circulation. Therefore, the time required for filling circulation can be shortened.

C. In the liquid discharge apparatus, the control section opens the supply channel by the second valve, and then pressurizes the inside of the second storage section with the pressurization section such that a pressure drop in the second storage section due to the opening of the supply channel by the second valve is reduced.

According to this configuration, compared to the case where the inside of the second storage section is not pressurized by the pressurization section after the supply channel is opened by the second valve, it is possible to reduce a pressure drop in the second storage section due to the opening of the supply channel by the second valve. Therefore, the pressure in the second storage section necessary for circulating the liquid in the circulation route and ejecting the liquid from the nozzle can be maintained.

D. In the liquid discharge apparatus, the first valve is a one-way valve, and closes the communication path as the second storage section is pressurized by the pressurization section.

According to this configuration, a drive mechanism for driving the first valve becomes unnecessary. Therefore, it is possible to suppress an increase in the number of components mounted on the liquid discharge apparatus.

E. In the liquid discharge apparatus, in which a temperature detection section that detects an environmental temperature, which is a temperature of an environment in which the liquid discharge apparatus is used, is further provided, and the control section closes the supply channel after a predetermined time elapsed in a state where the supply channel is opened by the second valve, and sets the predetermined time to be longer when the environmental temperature detected by the temperature detection section is a first temperature than when the environmental temperature is a second temperature higher than the first temperature.

The lower the environmental temperature, the higher the viscosity of the liquid. Therefore, there is a concern that the flow rate of the liquid flowing through the supply channel varies depending on the environmental temperature as the supply channel is opened by the second valve. According to this configuration, the predetermined time becomes longer when the environmental temperature is the first temperature than when the environmental temperature is the second temperature higher than the first temperature. Therefore, it is possible to suppress an increase or decrease in the flow rate of the liquid flowing through the circulation route due to changes in the environmental temperature.

F. In the liquid discharge apparatus, an inlet through which the liquid in the collection channel flows is formed in the first storage section, and the inlet is positioned below a center of the first storage section.

According to this configuration, the liquid flowing through the collection channel flows into the first storage section via the inlet. Since the inlet is positioned below the center of the first storage section, the liquid stored in the first storage section is stirred by the inflow of the liquid from the inlet. Therefore, sedimentation in the first storage section can be recovered.

G. In the liquid discharge apparatus, a third valve provided in the collection channel and configured to open and close the collection channel, is further provided, and the control section configured to change closing and opening of the collection channel by the third valve.

According to this configuration, it is possible to switch whether or not the liquid flows from the collection channel into the first storage section.

H. In a control method of a liquid discharge apparatus including a liquid ejecting head configured to eject a liquid from a nozzle, a first storage section that stores the liquid, a second storage section that communicates with the first storage section via a communication path and is supplied with the liquid from the first storage section, a supply channel that supplies the liquid from the second storage section to the liquid ejecting head, a collection channel that collects the liquid from the liquid ejecting head to the first storage section, a first valve provided in the communication path and configured to open and close the communication path, a second valve provided in the supply channel and configured to open and close the supply channel, and a pressurization section that pressurizes the inside of the second storage section, in which the first storage section, the supply channel, the liquid ejecting head, the collection channel, the second storage section, and the communication path form a circulation route through which the liquid circulates, the method including, when performing discharge circulation in which circulation of the liquid is performed in the circulation route while discharging the liquid from the nozzle, closing the communication path by the first valve and closing the supply channel by the second valve, pressurizing the inside of the second storage section to a first pressure higher than a Meniscus breaking pressure of the nozzle by the pressurization section, and then opening the supply channel by the second valve, and when performing non-discharge circulation in which circulation of the liquid is performed in the circulation route without discharging the liquid from the nozzle, closing the communication path by the first valve and closing the supply channel by the second valve, pressurizing the inside of the second storage section to a second pressure lower than the Meniscus breaking pressure by the pressurization section, and then opening the supply channel by the second valve.

According to this method, a plurality of pieces of processing such as discharge circulation and non-discharge circulation can be performed using the common circulation route. Therefore, it is possible to suppress complication of the route through which the liquid flows compared to the case where a plurality of pieces of processing are performed using different routes. Furthermore, according to this method, in the discharge circulation and the non-discharge circulation, the communication path is closed by the first valve and the supply channel is closed by the second valve before the supply channel is opened by the second valve, and at the same time, the inside of the second storage section is pressurized by the pressurization section. Therefore, compared to the case where the inside of the second storage section is pressurized after the supply channel is opened by the second valve, the liquid can be quickly circulated through the circulation route in the discharge circulation and the non-discharge circulation. Therefore, the time required for the plurality of pieces of processing such as discharge circulation and non-discharge circulation can be shortened.

I. In the control method of a liquid discharge apparatus, in which the liquid discharge apparatus further includes a temperature detection section that detects an environmental temperature, which is a temperature of an environment in which the liquid discharge apparatus is used, the method further includes closing the supply channel after a predetermined time elapsed in a state where the supply channel is opened by the second valve, and setting the predetermined time to be longer when the environmental temperature detected by the temperature detection section is a first temperature than when the environmental temperature is a second temperature higher than the first temperature.

The lower the environmental temperature, the higher the viscosity of the liquid. Therefore, there is a concern that the flow rate of the liquid flowing through the supply channel varies depending on the environmental temperature as the supply channel is opened by the second valve. According to this method, the predetermined time becomes longer when the environmental temperature is the first temperature than when the environmental temperature is the second temperature higher than the first temperature. Therefore, it is possible to suppress an increase or decrease in the flow rate of the liquid flowing through the circulation route due to changes in the environmental temperature.

What is claimed is:

1. A liquid discharge apparatus comprising:

a liquid ejecting head configured to eject a liquid from a nozzle;

a first storage section that stores the liquid;

a second storage section that communicates with the first storage section via a communication path and is supplied with the liquid from the first storage section;

a supply channel that supplies the liquid from the second storage section to the liquid ejecting head;

a collection channel that collects the liquid from the liquid ejecting head to the first storage section;

a first valve provided in the communication path and configured to open and close the communication path;

a second valve provided in the supply channel and configured to open and close the supply channel;

a pressurization section that pressurizes the inside of the second storage section; and a control section, wherein the first storage section, the supply channel, the liquid ejecting head, the collection channel, the second storage section, and the communication path form a circulation route through which the liquid circulates, and the control section is configured to execute discharge circulation in which the communication path is closed by the first valve and the supply channel is closed by the second valve, the inside of the second storage section is pressurized to a first pressure by the pressurization section, and then the supply channel is opened by the second valve to perform circulation of the liquid in the circulation route while discharging the liquid from the nozzle, and non-discharge circulation in which the communication path is closed by the first valve and the supply channel is closed by the second valve, the inside of the second storage section is pressurized to a second pressure lower than the first pressure by the pressurization section, and then the supply channel is opened by the second valve to perform circulation of the liquid in the circulation route without discharging the liquid from the nozzle.

2. The liquid discharge apparatus according to claim 1, wherein the control section is configured to execute filling circulation in which the communication path is closed by the first valve and the supply channel is closed by the second valve, the inside of the second storage section is pressurized to a third pressure lower than the first pressure and higher than the second pressure by the pressurization section, and then the supply channel is opened by the second valve to perform filling of the liquid in the circulation route while discharging the liquid from the nozzle.

3. The liquid discharge apparatus according to claim 1, wherein the control section opens the supply channel by the second valve, and then pressurizes the inside of the second storage section with the pressurization section such that a pressure drop in the second storage section due to the opening of the supply channel by the second valve is reduced.

4. The liquid discharge apparatus according to claim 1, wherein the first valve is a one-way valve, and closes the communication path as the second storage section is pressurized by the pressurization section.

5. The liquid discharge apparatus according to claim 1, further comprising:

a temperature detection section that detects an environmental temperature, which is a temperature of an environment in which the liquid discharge apparatus is used, wherein the control section closes the supply channel after a predetermined time elapsed in a state where the supply channel is opened by the second valve, and sets the predetermined time to be longer when the environmental temperature detected by the temperature detection section is a first temperature than when the environmental temperature is a second temperature higher than the first temperature.

6. The liquid discharge apparatus according to claim 1, wherein an inlet through which the liquid in the collection channel flows is formed in the first storage section, and the inlet is positioned below a center of the first storage section.

7. The liquid discharge apparatus according to claim 1, further comprising:

a third valve provided in the collection channel and configured to open and close the collection channel, wherein the control section configured to change closing and opening of the collection channel by the third valve.

8. A control method of a liquid discharge apparatus including a liquid ejecting head configured to discharge a liquid from a nozzle, a first storage section that stores the liquid, a second storage section that communicates with the first storage section via a communication path and is supplied with the liquid from the first storage section, a supply channel that supplies the liquid from the second storage section to the liquid ejecting head, a collection channel that collects the liquid from the liquid ejecting head to the first storage section, a first valve provided in the communication path and configured to open and close the communication path, a second valve provided in the supply channel and configured to open and close the supply channel, and a pressurization section that pressurizes the inside of the second storage section, in which the first storage section, the supply channel, the liquid ejecting head, the collection channel, the second storage section, and the communication path form a circulation route through which the liquid circulates, the method comprising:

when performing discharge circulation in which circulation of the liquid is performed in the circulation route while discharging the liquid from the nozzle, closing the communication path by the first valve and closing the supply channel by the second valve, pressurizing the inside of the second storage section to a first pressure higher than a Meniscus breaking pressure of the nozzle by the pressurization section, and then opening the supply channel by the second valve; and when performing non-discharge circulation in which circulation of the liquid is performed in the circulation route without discharging the liquid from the nozzle, closing the communication path by the first valve and closing the supply channel by the second valve, pressurizing the inside of the second storage section to a second pressure lower than the Meniscus breaking pressure by the pressurization section, and then opening the supply channel by the second valve.

9. The control method of a liquid discharge apparatus according to claim 8, in which the liquid discharge apparatus further includes a temperature detection section that detects an environmental temperature, which is a temperature of an environment in which the liquid discharge apparatus is used, the method further comprising closing the supply channel after a predetermined time elapsed in a state where the supply channel is opened by the second valve, and setting the predetermined time to be longer when the environmental temperature detected by the temperature detection section is a first temperature than when the environmental temperature is a second temperature higher than the first temperature.

* * * * *